(12) United States Patent
Hightower et al.

(10) Patent No.: US 10,668,350 B2
(45) Date of Patent: Jun. 2, 2020

(54) LAUNCH MONITOR USING THREE-DIMENSIONAL IMAGING

(71) Applicant: Acushnet Company, Fairhaven, MA (US)

(72) Inventors: Charles Hightower, Hyde Park, MA (US); Leonidas Amarant, Middletown, RI (US); Paul A. Furze, Tiverton, RI (US); Richard Daprato, North Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 16 days.

(21) Appl. No.: 15/852,008

(22) Filed: Dec. 22, 2017

(65) Prior Publication Data

US 2019/0192944 A1    Jun. 27, 2019

(51) Int. Cl.
*A63B 69/36* (2006.01)
*A63B 24/00* (2006.01)
*G06T 7/285* (2017.01)
*G06T 7/593* (2017.01)
*G06T 7/20* (2017.01)
*G06T 7/557* (2017.01)
*G06T 7/90* (2017.01)

(52) U.S. Cl.
CPC ...... *A63B 69/3658* (2013.01); *A63B 24/0006* (2013.01); *G06T 7/20* (2013.01); *G06T 7/285* (2017.01); *G06T 7/557* (2017.01); *G06T 7/593* (2017.01); *G06T 7/90* (2017.01); *A63B 2220/05* (2013.01); *A63B 2220/35* (2013.01); *A63B 2220/807* (2013.01); *G06T 2207/10024* (2013.01); *G06T 2207/10052* (2013.01); *G06T 2207/30204* (2013.01); *G06T 2207/30224* (2013.01)

(58) Field of Classification Search
CPC .... A63B 2071/0647; A63B 2024/0009; A63B 2024/0028; A63B 2024/0068; A63B 2024/0056; A63B 2220/806; A63B 69/3632; A63B 69/3614; A63B 2069/3605
USPC ............... 473/141, 152, 155, 219, 221, 257; 382/107, 291
See application file for complete search history.

(56) References Cited

U.S. PATENT DOCUMENTS

| | | | | |
|---|---|---|---|---|
| 5,474,298 A * | 12/1995 | Lindsay | ............. | A63B 69/3632 473/222 |
| 5,638,300 A * | 6/1997 | Johnson | ............. | A63B 24/0003 473/223 |
| 6,042,483 A * | 3/2000 | Katayama | .......... | A63B 24/0003 473/152 |
| 6,241,622 B1 * | 6/2001 | Gobush | ............. | A63B 24/0003 473/199 |

(Continued)

FOREIGN PATENT DOCUMENTS

EP    1335216    * 7/2004    ............. G02B 5/282

*Primary Examiner* — Michael A Cuff
(74) *Attorney, Agent, or Firm* — Mandi B. Milbank

(57) ABSTRACT

A launch monitor that generates three dimensional images to accurately measure movement of golf objects. In an aspect, the launch monitor can utilize stereographic camera systems to capture images from which three dimensional images can be generated. In an aspect, the launch monitor can utilize light-field camera systems to capture images of the golf objects. In an aspect, the camera systems can capture images in color.

14 Claims, 21 Drawing Sheets

(56) References Cited

U.S. PATENT DOCUMENTS

| | | | | |
|---|---|---|---|---|
| 7,744,480 B2* | 6/2010 | Gobush | ............ | A63B 24/0003 |
| | | | | 473/150 |
| 7,887,440 B2* | 2/2011 | Wright | ............... | A63B 24/0003 |
| | | | | 473/409 |
| 8,852,016 B2* | 10/2014 | Kamino et al. | .... | A63B 24/0021 |
| | | | | 473/221 |
| 2003/0008731 A1* | 1/2003 | Anderson | .......... | A63B 24/0003 |
| | | | | 473/407 |
| 2005/0261071 A1* | 11/2005 | Cameron | .......... | A63B 24/0003 |
| | | | | 473/219 |
| 2005/0272516 A1* | 12/2005 | Gobush | ............. | A63B 24/0003 |
| | | | | 473/200 |
| 2006/0008116 A1* | 1/2006 | Kiraly | ...................... | G06T 7/20 |
| | | | | 382/103 |
| 2007/0298898 A1* | 12/2007 | Kiraly | ............... | A63B 24/0021 |
| | | | | 473/131 |
| 2008/0220891 A1* | 9/2008 | Gobush | ............. | A63B 69/3632 |
| | | | | 473/221 |
| 2011/0028247 A1* | 2/2011 | Ligotti | ............... | A63B 24/0003 |
| | | | | 473/407 |
| 2011/0028248 A1* | 2/2011 | Ueda | .................. | A63B 69/3614 |
| | | | | 473/409 |
| 2011/0319461 A1* | 12/2011 | Partridge | ............. | C07D 233/64 |
| | | | | 514/400 |
| 2013/0116808 A1* | 5/2013 | Molinari | ................ | A63B 69/36 |
| | | | | 700/91 |
| 2016/0350922 A1* | 12/2016 | Tofolo | ...................... | G06T 7/20 |
| 2017/0273864 A1* | 9/2017 | Kaufman | ............. | A61H 31/005 |
| 2019/0157470 A1* | 5/2019 | Send | ....................... | G01S 17/46 |

* cited by examiner

LAUNCH MONITOR USING THREE-DIMENSIONAL IMAGING

FIELD OF THE INVENTION

The present invention relates to a launch monitor. More specifically, the present invention relates to a launch monitor configured to measure ball velocity and acceleration using three-dimensional imaging.

BACKGROUND OF THE INVENTION

Competitive athletes are constantly in search of tools to fine-tune each aspect of their game. For competitive golf players, the key to improvement often entails selection of equipment that optimally fits their specific swing characteristics, Thus, a competitive golf player benefits from using tools that enable them to observe and analyze alternative equipment as well as each aspect of their swing. By doing so, a player can make changes necessary for achieving optimal performance, which may ultimately lead to a better score.

The tools that are often used to aid competitive golf players are commonly referred to as launch monitors. A launch monitor typically includes an imaging system that is capable of imaging dynamic events such as the motion of the golfers club, golf balls, or the body of the golfer. The image may include one or more image frames. The image or images may then be analyzed using a desired mathematical algorithm that enables the kinematic characteristics of the club, ball, or body to be determined.

Over the past thirty years, launch monitors have been developed and improved upon. An example of one of the earliest high speed imaging systems, entitled "Golf Club Impact and Golf Ball Monitoring System," to Sullivan et al., was filed in 1977. This automatic imaging system employed six cameras to capture pre-impact conditions of the club and post impact launch conditions of a golf ball using retroreflective markers. Shortly thereafter, a two-camera system capable of triangulating the location of retroreflective markers appended to a club or golf ball in motion was developed. Such systems are disclosed in U.S. Pat. Nos. 5,471,383 and 5,501,463.

Additional kinematic measurement systems have been developed over the years implementing and building on this concept. For example, U.S. Pat. No. 5,906,547 measures the speed and trajectory of a specialized golf club through the use of specific club-identifying markers, and extrapolates those measurements to determine the kinematics of an imaginary golf ball. U.S. Pat. Nos. 7,292,711 and 7,324,663 use a single camera to determine the velocity, launch angle, and spin of the ball after being struck by a club. Other systems have been developed that are configured to the kinematics of both the golf ball and golf club. For example, U.S. Patent Publication No. 2002/0155896 describes a method of monitoring both golf clubs and balls in a single system. U.S. Patent Publication No. 2002/0173367 generally discloses the use of fluorescent markers in the measurement of golf equipment.

Other systems have been introduced based upon the same principles discussed above for measuring the kinematics of golf clubs and balls. For example, U.S. Pat. No. 8,622,845 generally discloses a portable launch monitor that uses multiple cameras and computational means to generate and display launch angle and other various related measurements. In addition, U.S. Pat. No. 9,516,276 discloses a system that utilizes the camera on an individual's mobile device to measure the speed and trajectory of a struck soccer ball.

Despite the general advancements discussed above, the known systems have drawbacks. For example, several of the systems above do not have the capacity to provide accurate measurements and instead rely on extrapolation and assumptions to determine the kinematics of the clubs and balls. In fact, U.S. Pat. Nos. 7,292,711, 7,324,663, and 9,516,276 make assumptions on the size of the tracked ball and then extrapolate measurements based upon the assumptions and captured data. Extrapolated measurements based upon the assumptions typically lead to inaccuracies. In addition, many prior art systems capture only a single image of the golf objects that is double exposed, which can result in a ghost-like double image of the moving object. Furthermore, in such instances, light sources that can provide a flash for the double exposure (e.g., strobes) are needed, which adds to the overall components required by the system, Additionally, with more strobe firings, the objects appear fainter, which then makes it difficult to distinguish the objects from the background.

One way to address this issue is through the use of color. In fact, many known systems employ a combination of strobes, black and white cameras with color filters, and fluorescent markers on the moving objects (i.e., the golf ball and/or golf club). The light emitted through the strobe is filtered by the color filters on the cameras, making the fluorescent markings on the object the only items visible to the camera. However, this purported solution does not fully address the issue because normal white light contains all colors. Furthermore, under some lighting conditions, in which external light (e.g., sunshine) is shining directly on the object, both the extra light and the intended light (e.g., strobe or laser reflected off of markers on the ball or the ball itself) can be detected by the cameras. An object in bright sunlight that is white, shiny metal, or a combination thereof that is in the field of view of the camera may have enough intensity in the same range as the color filter to show through. Because balls are usually bright white, this is problematic when trying to determine the kinematics of a golf club where the ball is part of the background. Likewise, because golf clubs are typically formed from metal, determining the kinematics of the ball with the golf club in the background is also problematic when using such systems. The detection of two different sources of light off of the target results in the misidentification of markers, causing computations (e.g., algorithms) to function improperly, which typically results in missing swing and/or shot data and may result in a partially or completely non-functional system.

In addition, the use of only black and white images limits the monitoring to only specific colors of balls. For example, only white balls or colored balls that do not fluoresce in the orange and green band of the light spectrum can be used with such launch monitor systems.

Therefore, there is a need in the art for a system that addresses and overcomes the shortcomings discussed above.

SUMMARY OF THE INVENTION

The present invention is directed to an apparatus for measuring golf club and golf ball kinematics where the apparatus includes a camera system capable of acquiring a plurality of images in a field of view. In one embodiment, the camera system is configured to capture a plurality of images of a golf club and a golf ball. For example, in one embodiment, the camera system of the invention is able to simultaneously capture a plurality of images of both the golf club and golf ball. In another embodiment, the camera system of the invention utilizes high-speed cameras to accurately capture the plurality of images.

The camera system may be configured to capture images of the object or objects that utilize the actual distance of the object from the camera system, as opposed to using the size of the objects to gage distance (i.e., the smaller the object is, the greater the distance) to generate three-dimensional images used for determining the kinematics. Without being bound by any particular theory, the camera system of the present invention is more accurate and reliable than known methods that use the apparent size of the object to infer distances from the camera.

In one embodiment, the camera system includes a light-field camera system that includes at least one light-field camera configured to capture the intensity of light and the direction of the light rays traveling in space, which reduces the overall hardware components needed for the camera system. In this aspect of the invention, the light-field camera system may include a plurality of light-field cameras. For example, the plurality of light-field cameras may include one light-field camera to capture images of the golf club and a second light-field camera to capture images of the golf club. The light-field camera system may also include more than two light-field cameras.

In another embodiment, the camera system includes a stereographic camera system. In this aspect, a plurality of cameras are used. For example, in one embodiment, stereographic camera system includes a first pair of cameras that captures images of the golf club and a second pair of cameras to capture images of the golf ball.

In yet another aspect of the invention, the camera system can be configured to utilize color cameras to capture color images. In particular, the color cameras may detect specific colors within the light spectrum, and capture these images in color. As a result, a variety of predetermined color markers and/or golf balls can be captured. In such aspects, the camera system can send the color images to software and/or hardware configured to filter the images for the predetermined color(s), and rejects any objects within the images of the golf ball and/or the golf clubs.

The apparatus and method of the present invention is capable of determining golf club kinematic information including, but not limited to, club head speed, club head acceleration, club head path angle, club head attack angle, club head loft, club head droop, club head face angle, club head face spin, club head droop spin, club head loft spin, ball impact location on the golf club face, horizontal impact position, vertical impact position, as well as the motion of the object (club and ball) in six degrees of freedom, including three translational and three rotational. In addition, the apparatus and method of the present invention is capable of determining golf ball kinematic information including, but not limited to, ball speed, ball acceleration, ball elevation angle, ball azimuth angle, launch angle, side angle, ball back spin, ball rifle spin, ball side spin, total spin, estimated trajectory, and ball impact location on the golf club face.

In an aspect, the invention is directed at a launch monitor configured to monitor a dynamic golf object (which can include a golf club or a golf ball), the launch monitor comprising a camera system configured to capture a plurality of images of the dynamic golf object for use to generate three dimensional images and a processor in communication with the camera subsystem, the processor configured to generate the three dimensional images from the plurality of images captured by the camera subsystem and generate kinematic information of the dynamic golf object from the three dimensional images. In another aspect, the launch monitor generates three dimensional images by determining the actual distance of the dynamic golf object from the launch monitor. In another aspect, the launch monitor generates the three dimensional images from a sequential portion of a plurality of images to form sequential three dimensional images and uses a difference in distance of selected points of the dynamic golf object in the sequential three dimensional images to find the kinematic information. In another aspect, the launch monitor determines the distance of the dynamic golf objects by measuring in the x, y, and z directions.

In an aspect, the launch monitor utilizes a camera system including at least one stereographic camera subsystem having at least two cameras focused on a field of view that includes the dynamic golf object. In another aspect, the two cameras of the launch monitor are placed at different locations from one another and directed at the field of view. In one embodiment, the two cameras of the launch Monitor are high speed cameras. In such aspects, the high speed cameras can include adjustable shutter speeds. In other embodiments, the two cameras are color cameras. In other aspects, the launch monitor can utilize a camera system that includes at least one light field camera subsystem, including at least one light field camera, wherein the light field camera is configured to capture intensity of light and direction of light rays. In another aspect, the light field camera includes a high speed light field camera, which could be a color high speed light field camera or a black and white high speed light field camera. In an aspect, when a high speed color light field camera is used, the processor can be configured to apply filters to eliminate false light from portions of images.

In an aspect, the launch monitor can utilize camera systems with color cameras, with the launch monitors processor configured to utilize color filters to eliminate false light from the dynamic golf object in the plurality of images. In some cases, the color filters include HSI filters. In another aspect, the process of the launch monitor can be configured to process a plurality of images by identifying markings of interest of the dynamic golf object and distinguishing the markings of the interest from the background, analyze the images to identify pixel locations of the dynamic golf object and the markings of interest into three dimensional locations, and generate the three dimensional images from the pixel locations. In an aspect, the launch monitor is configured to monitor both a golf club and a golf ball at the same time and can generate the kinematics of both at the same time as well. In an aspect, the launch monitor can be configured to a plurality of images of the dynamic golf object for use to generate sequential three dimensional images and then, via the processor, generate the sequential three dimensional images from the a portion of sequential images from the plurality of images captured by the camera subsystem by determining the actual distance of the dynamic golf object from the launch monitor, and generate kinematic information of the dynamic golf object from the three dimensional images by measuring the distance in three directions.

In an aspect, the launch monitor can use cameras with an exposure time shorter than about 80 microseconds, preferably shorter than about 20 microseconds, most preferably shorter than about 10 microseconds and a frame rate faster than about 500 Frames Per Second (FPS), preferably faster than about 1500 FPS, most preferably faster than about 5000 fps. In another aspect, the launch monitor can include a resolution of at least about 32 pixels per inch, preferably about 200 pixels per inch, most preferably about 1000 pixels per inch. In an aspect, the launch monitor can include one color camera that can distinguish colored markers from the background. In other aspects, the launch monitor can utilize light field technology (plenoptic camera(s)).

DETAILED DESCRIPTION OF THE INVENTION

Figure 1:
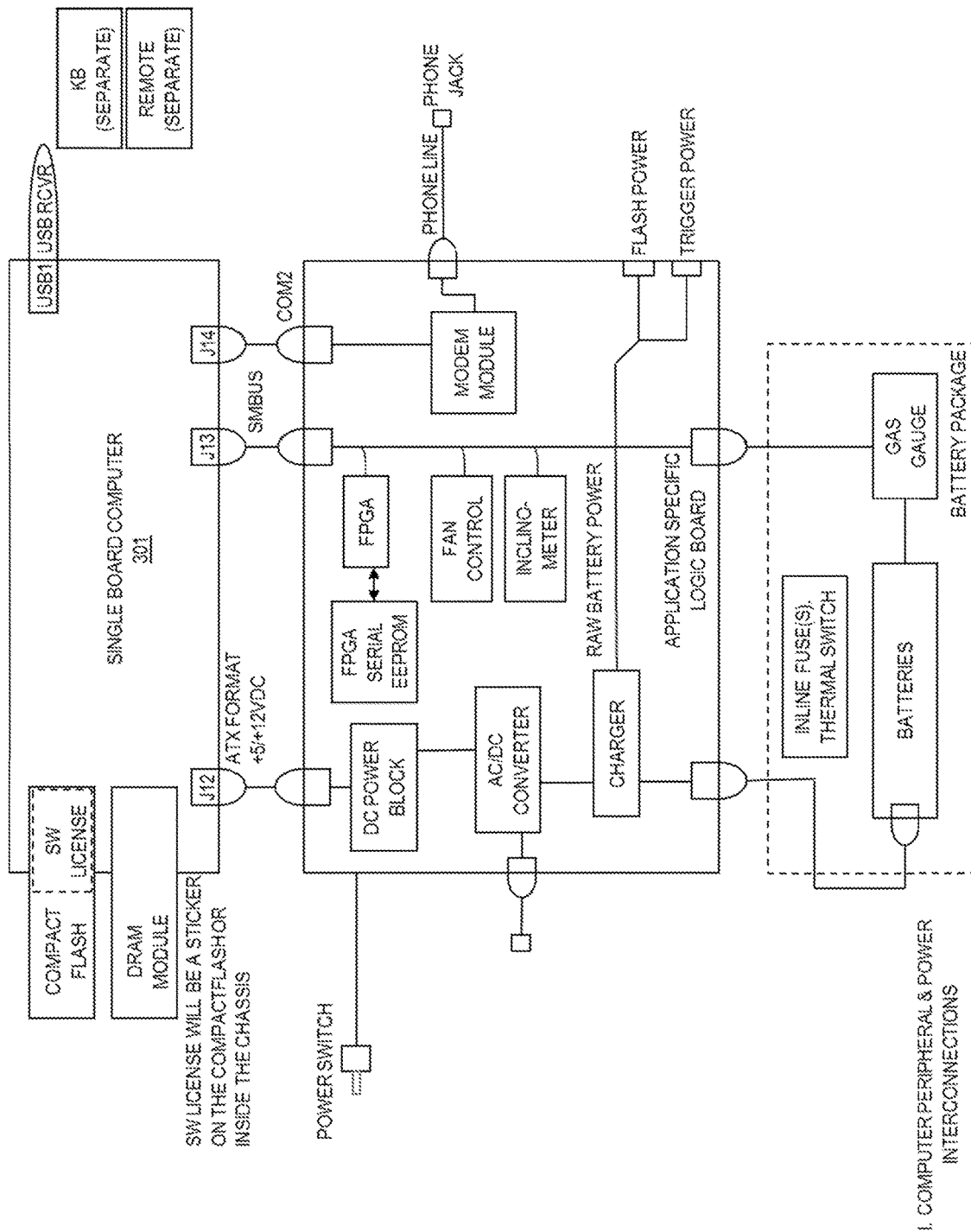
FIGS. 1-5 are block diagrams that illustrate the major functional components in an embodiment of the present invention.
Figure 2:
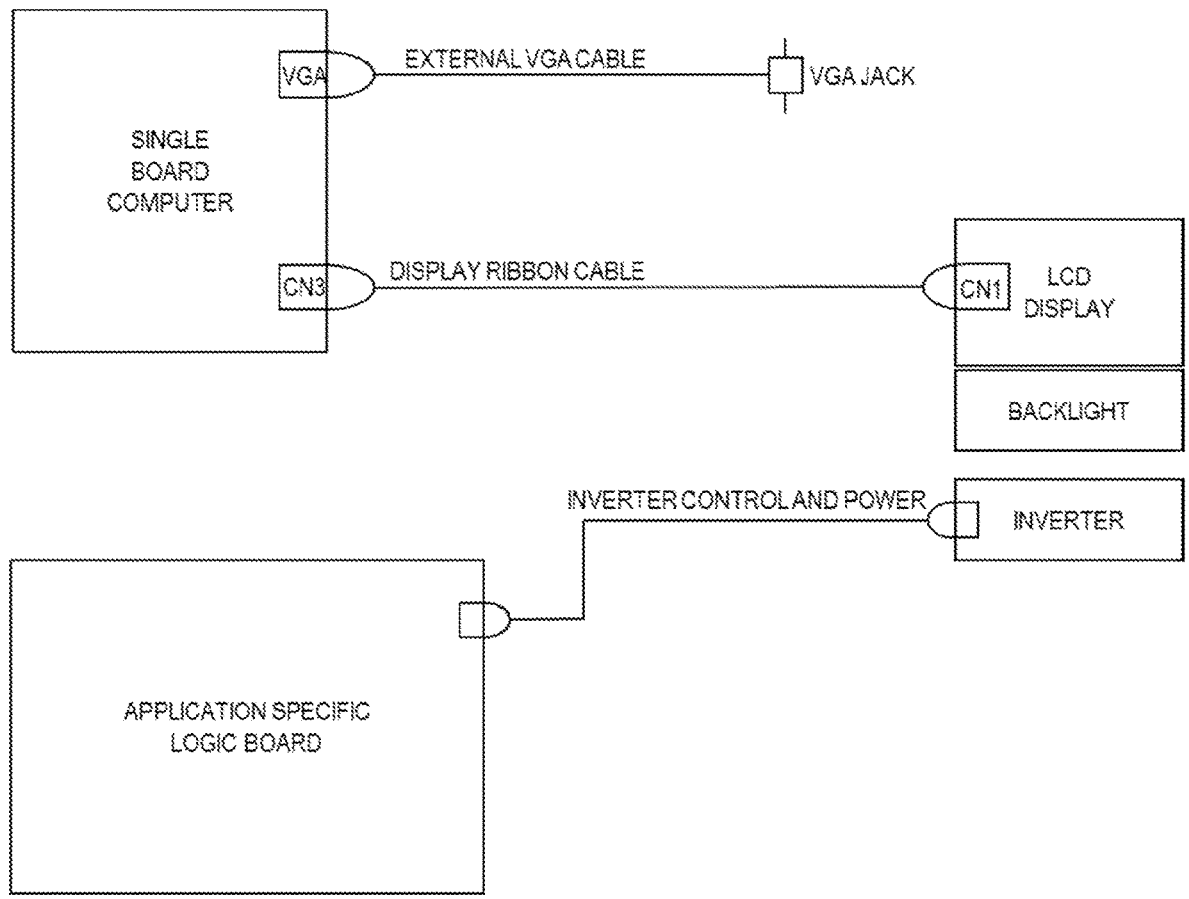

The present invention relates to a launch monitor that is configured to capture images of golf objects that are then used by a processor to generate three dimensional images/models of the golf objects from which the kinematics of the golf objects can be measured. The images generated by the camera system allow the launch monitor, and more specifically the processor and the programs called upon by it, to capture actual measurements of the golf objects as generated in a three dimensional environment, increasing the accuracy of the overall launch monitor. In such aspects, the launch monitor can include, but not limited to, the camera system and a processor.

In one embodiment, the golf ball may be placed at a desired point within a field of view of the launch monitor in order to ensure accuracy. The field of view defines the area from which the camera system captures images of the golf objects. In one embodiment, the field of view is fixed. In another embodiment, the field of view is variable. In an aspect, the use of two cameras can enlarge the field of view. In one aspect, a known launch point in the field of view is pre-determined for use with the launch monitor. More specifically, the launch monitor can be configured to be stationary, with a given area marked for placement of the golf ball within the field of view. In other aspects, a user may utilize a teeing aid that helps determine proper placement of the ball by the user. In other embodiments, the processor can be configured to determine the distance from the launch point based upon three dimensional information from the camera system. Regardless of the means used to place the golf objects within the field of view, the launch monitor of the present invention relies on the actual distances of the golf objects from the cameras in the camera system in order to ensure accurate kinematic measurements.

In one embodiment, the launch monitor has a fixed field of view such that the launch monitor does not move during the capture of images of the golf objects. Thus, the kinematic characteristics of the ball are determined based on images of the ball that are taken soon after impact with the golf club. Likewise, the kinematic characteristics of the golf club are taken upon the movement of the club through the field of view.

Camera System

The launch monitor uses a camera system that is configured to capture multiple images of the golf objects (e.g., the golf ball and the golf club) that allow the generation of three dimensional (3D) images/models (discussed in more detail below) from which 3D measurements can be taken. Once the camera systems have taken multiple images and multiple 3D images/models have been created, the difference between the positions of the objects in the different images is measured. Using the differences captured, as well as the known difference in time between the taken images, various kinematic values of the objects can be generated, as discussed in more detail below.

In order to create the 3D image models referenced above, in one embodiment, the camera system is configured to measure the motion of the golf objects in three dimensions. In one embodiment, the camera system includes stereographic cameras. In another embodiment, the camera system includes light-field cameras. Other types of cameras are contemplated by the invention can be utilized in this aspect provided that the cameras are configured to capture images that can accurately create 3D images/models of the golf objects as they move in order to capture three dimensional data.

In an aspect, the camera system in the launch monitor of the present invention includes one or more camera subsystems that are used to acquire images of the golf club and golf ball in motion. In this aspect, the camera subsystems may include stereographic camera subsystems. In one embodiment, the stereographic camera subsystems include a plurality of cameras. In another embodiment, the stereographic camera subsystems include a two or more cameras. In yet another embodiment, three or more cameras are included in the stereographic camera subsystems. Without being bound to any particular theory, three or more cameras are used to provide a larger field of view and greater accuracy. The plurality of cameras are placed at different locations from one another in order to each capture multiple 2D images of the moving golf objects, which then can be assembled by the processor to form 3D images. In one embodiment, the cameras of each stereographic camera subsystem are configured to be synchronized in time with each other. In another embodiment, a separate sensor is hardwired to each camera to ensure the cameras in the stereographic camera subsystem take images at the same time. Suitable sensors for use in this aspect of the invention include, but are not limited to, acoustic, laser, and combinations thereof.

In some cases, the cameras of the stereographic camera subsystems include high-speed cameras, discussed in more detail below. In one embodiment, the cameras of the stereographic camera subsystems further include color cameras. In another embodiment, two stereographic camera subsystems are used, with one stereographic camera subsystem configured and positioned to acquire images of the golf club and the other stereographic camera subsystem configured and positioned to acquire images of the golf ball. The images captured by the stereographic camera subsystems (i.e., two 2D images captured at the same time of the same object from different perspectives) can then be used and paired together to generate three dimensional data.

In other aspects, the camera subsystems can include light-field camera subsystems, wherein each light-field camera subsystem includes a light-field camera. As discussed above, a light-field camera captures normal 2D data (light intensity) as well as depth data (i.e., light directional data) via special optics and processing. In one embodiment, one light-field camera is configured and positioned to acquire images of the golf club, while the other light-field camera is configured and positioned to acquire images of the golf ball. In another embodiment, the light-field cameras can be color light-field cameras. In yet another embodiment, the launch monitor can utilize a single color light-field camera with different color markers on the golf club and golf ball to capture the movement of both the golf club and golf ball. In some aspects, high speed video cameras can be used to capture the images as well. These and other aspects are discussed in detail below.

In order to analyze the kinematic properties of the golf club and golf ball, not only do accurate dimensions need to be captured, but also the time between the images must be accurately captured as well. In order to be as accurate as possible, it is desirable that the cameras of the camera system have short exposure times, with short intervals between consecutive images. In an aspect, the camera systems of the present invention collect multiple images considered in two different ways. In the first aspect, the camera system utilizes double exposure of one image with the use of a strobe light. In the second aspect, the camera system utilizes a camera with a frame rate fast enough to capture multiple images while the object is within its field of view. For example, in 0.0025 seconds (2.5 mS), a ball spinning at 12000 rpm will turn one half of a revolution or a ball travelling at 175 mph will move 7.7 inches. However, the faster the frame speed or strobe response time is, the more accurate the camera systems. In this aspect, the frame speed and/or strobe response time can range between approximately 0.5 mS and 2.5 mS between images. In one embodiment, the frame speed and/or strobe response time can range between approximately 0.75 mS and 2.0 mS between images. In another embodiment, the frame speed and/or strobe response time can range between approximately 1.0 mS and 2.0 mS between images. In yet another embodiment, the frame speed and/or strobe response time can range between approximately 1.5 mS and 2.5 mS between images. In still another embodiment, the frame speed and/or strobe response time can range between approximately 0.5 mS and 1.5 mS between images.

In one embodiment, the camera systems of the launch monitor of the present invention utilize high speed cameras. More specifically, the high speed cameras have high frame rates, allowing multiple images of the object to be captured in a short period of time. Capturing more than two images of an object enables the measurement of acceleration and curvature of motion. High speed cameras also typically have short exposure (shutter) times. Using shorter exposure times reduces motion blur, which can increase accuracy. In an aspect, the high frame speed is determined by the shutter speed of the camera. In an aspect, the shutter is an electronic shutter, which allows for different programming of the shutter speed. Using a camera with a frame rate fast enough to capture multiple images of an object in the field of view (generally referred to as 'high speed video') has several advantages. First, there is no need for a special strobe light to eliminate motion related blurring. Second, the shutter on the camera can be opened for a very short time. The shutter speed can be adjusted based on the speed of the object, longer for slower moving objects to let in more light and shorter for faster moving objects to reduce blurring. Ghost images, as discussed above, are eliminated, because there is no double exposure, meaning that more than two images of the moving object may be taken. The number of images is limited only by the frame rate of the camera and the time that the object is within the camera's field of view. In one embodiment, the stereographic and the light field cameras can utilize high speed cameras. However, if the stereographic camera subsystems are used, the multiple cameras of the subsystems need to be synchronized so that they capture images at the same time.

As discussed above, the launch monitor of the present invention can also capture the movement of the golf objects through the use of double exposures. In such aspects, the camera subsystems utilize a combination of strobe lights and cameras. In an aspect, it is desirable for the strobe lamp to generate multiple flashes of light within a short period of time. This allows multiple images of both a golf club and ball to be taken before and after impact. Thus, it is desirable to minimize the time required for successive flashes. Preferably, the lag time between successive flashes should fall within the shutter speed of the camera system. In an aspect, two or more flashes are generated within a short amount of time.

The sequence for capturing a double exposed image is as follows. The shutter of the camera opens and the camera begins to collect light. In one embodiment, the shutter is electronic. After a short delay (e.g., about 10 mS), the first strobe fires. After a second delay (e.g., about 0.5 mS to about 2.5 mS, as discussed above), the second strobe fires. After another short delay, the shutter closes. The strobe produces a lot of light in two very short bursts, e.g., about 30 to 50 microseconds long. The camera collects as much light as possible at those two times to diminish the blurring in between and create an image of the object, stopped in two positions.

However, as discussed above, the double exposed image using this approach produces a ghost-like, see-through image of the golf object in which the background bleeds through. The problem is intensified with more strobe firings as the golf object becomes fainter, which results in an issue of trying to distinguish the object from the background. In order to overcome this issue, the present invention contemplates the use of color cameras and digital color filters that are called upon by the processor (e.g., image processing software). This differs from known systems that use color filters and black and white cameras of the prior art systems. Indeed, known systems utilized color filters on both the black and white cameras and strobe sources where the light emitted through the strobe filter would be blocked by the filters on the cameras so that the fluorescent markings on the golf object were the only things visible to the camera. However, as discussed in the Background, white or shiny metal objects may have enough intensity in the same range as the color filter to show through. In addition, in certain lighting conditions, extra light can be captured with the intended light sources, which can cause marker detection algorithms used in black and white imaging systems to misidentify markers, and provide false information. Here, the combination of the color cameras and the digital color filter solves the problem of a white or shiny object showing through; the color camera captures the images and all of the included colors. Because the digital filter will only respond to the correct color (and not to white), there is no shining through of the background object.

When the launch monitor of the present invention includes one or more color camera systems, color markers may also be employed. In particular, by using color camera systems, color images of the golf objects can be captured. The color images of the golf objects can then be analyzed. Passing along the color images to the processor allows the system to identify specific colors within the light spectrum previously identified and assigned to the system, thereby providing a means to eliminate the unintended light. In addition, by using color cameras, various colors of golf balls, golf clubs, and markers can be used. In such aspects, the use of color camera subsystems can potentially eliminate the use of one subsystem. For example, a single color stereographic camera subsystem (i.e., only two color cameras) can be used in combination with a golf club having marks/reference points of one color different from markers/ reference points of the golf ball. Likewise, a single light-field camera can be utilized for golf clubs and golf balls having markers/reference points of different colors. The use of one camera subsystem for both golf clubs and golf balls can help eliminate a need to place the ball in a narrow space. In an aspect, the ghost effect can still be present though, but the use of a high speed color camera can eliminate any ghost imaging.

In one aspect, the images produced by the color camera systems can have filters applied to them. In particular, the color filters can break down a color image into three separate images, either RGB or HSI. If an RGB filter is used, three gray scale images are created from one color image in which the gray value of the pixels represent the brightness of a specific color in that pixel location. The first image represents the amount of red in each pixel, the next image represents the amount of green in each pixel, and the last image represents the amount of blue in each pixel (i.e., RGB). A distinct color is represented by a certain ratio of red green and blue. To find the color of a specific pixel in an image, software interrogates the ratio of red, green, and blue for that pixel. If the pixel had the correct ratio that pixel location in a fourth, output image would be marked as white, otherwise the pixel would be black. The process is repeated for each pixel location. The output image then shows the colored markings as white marks against a completely black background.

An HSI filter also creates three gray scale images. In this case, the gray values in the first image represent the hue, or color of the pixels in the color image. The second image represents saturation, which gives a measure of the degree to which a pure color is diluted by white light. The third image represents intensity, which gives an indication of the total brightness of a pixel (i.e., HSI). With the HSI filter, the software only needs to identify a value or range of values in the hue image that represent the color of interest. A gray level threshold tool can identify the pixels and create an output image, as described above. Machine vision software packages simplify the process further by allowing the user to select a color, then automatically creating an output image.

Given the speed at which the images are captured, it is preferable to have the acquired images transferred to an electronic memory soon after they are acquired by the imaging sensor of each camera. In one embodiment, each camera is attached to a processor, such as a computer. In one aspect, a digital processor and digital memory are used to process the acquired images. Because consecutive images are acquired within a short time interval, it is desirable to have a hardwire connection that allows rapid transfer of information between the imaging sensor, memory and the processor. The hardwire bus used should also provide the advantage of flexible interconnectivity. Various buses, including, but not limited to, FireWire, PCI express, USB, or Camera Link, may be used.

The bus speed is preferably chosen to maximize the speed of data transfer between the cameras and the processor. Preferably, the bus speed is greater than 100 Mbps. More preferably, the bus speed is greater than about 400 Mbps, and most preferably the bus speed is greater than about a gigabit. In one aspect, the camera system can be separate systems that can communicate with a stand-alone computing device, such as a laptop or smart mobile device. In such aspects, the images can be communicated via wireless and wired means. In another aspect, the camera systems can be part of the smart device (e.g., a light-field camera module within a smart phone).

As discussed above, the camera subsystems can be configured to capture images of both the golf club and golf ball. Preferably, the camera subsystems are able to take multiple images of the golf ball and/or golf club to analyze the movement of the club and/or ball. This may be accomplished using a variety of methods. Preferably, a multi-frame method may be employed. This method is well known to those skilled in the art, and involves taking multiple images in different frames.

According to the method of the present invention, a golf club and golf ball are imaged using the apparatus described above. A golf club and ball may be placed in front of the apparatus. In accordance with the present invention, a golf club may be imaged on the upswing or on the downswing, depending on a particular application. In one embodiment, multiple images of the golf club are captured during the downswing and the ball after impact. In another embodiment, multiple images of the golf club are captured during the upswing and the ball after impact. In yet another embodiment, multiple images of the golf club are captured during the upswing, during the downswing, at impact, and the ball after impact.

The swing speed of a club and, thus, the velocity of the ball, may vary based on the skill or experience of a player, or the type of club being used. In order to extract useful information about the club and ball, such as that described above, the time interval between captured images may be varied to improve kinematic accuracy. As discussed, the camera systems can include high-speed cameras. It is desirable to maximize the separation of subsequent object images within a given field of view. It also may be necessary to acquire subsequent ball images prior to 360 degrees of ball rotation. By taking many images at a high rate, it is possible to select images that have enough separation between the object's positions in order to accurately measure the movement of the object.

Swing speeds may vary between 30 and 130 mph, and ball speeds may vary between 50 and 230 mph. For example, the club speed of a small headed club (e.g., a 175 cc club head) has a faster club speed than a typical driver. In some embodiments, the difference between the club speed and the ball speed may be large. In such embodiments, the time interval between two images of the club and the time interval between two images of the ball may be different. Therefore, it is a desirable function of the launch monitor to have adjustable shutter timing, given time intervals typically depend on the velocity of the club and/or ball, which can be dependent on the size of the balls, clubs, and users. In such aspects, programmable electronic shutters can be employed by both stereographic and light-field cameras.

The shutter speed of the high-speed cameras can range between about 1,000 frames per second to about 10,000 frames per second. In one embodiment, the frames per second is equal to or above about 2,000 frames per second. In another embodiment, the frames per second ranges from about 2,500 frames per second to about 10,000 frames per second. In one embodiment, faster swings (e.g., 120 mph for a driver) have an interval between frames of 70-100 microseconds and slower swings (e.g., using a wedge) have an interval of approximately 400-500 microseconds. As such, an electronic shutter is contemplated for use in the launch monitor of the present invention. In fact, such shutters can be programmable, which allows users to set the shutter speed based upon the skill level of the user and the type of club being used. In an aspect, the shutter speed would vary with the object speed.

In one embodiment, the camera systems include an imaging sensor and lens assembly, and a camera control board. In an aspect, these components can be integrated within the camera itself, or be separate components connecting with the camera. With the former, all that is required is a network connection, power, and an external trigger. When the camera system includes a light-field camera, the lens assembly may include a plurality of lenses. In one embodiment, the imaging sensor may be a CCD. However, other types of sensors, such as a CMOS sensor, may be used.

It is desirable for the resolution of the camera(s) of the camera subsystem(s) to be sufficient to allow an accurate kinematic analysis of the images. Increasing the resolution of the camera allows a more detailed picture to be taken of a golf club and ball in motion. This in turn provides the advantage of allowing more accurate and precise kinematic calculations. Preferably, the resolution of the camera is about 1,900,000 pixels or greater (e.g., 1600×1200 resolution). In the case of color cameras, the resolution of the camera can be approximately 4 megapixel to 8 megapixel. In one embodiment, the resolution of the camera can be approximately 5 megapixel to 7 megapixel. In another embodiment, the resolution of the camera can be approximately 4 megapixel to 6 megapixel. In yet another embodiment, the resolution of the camera can be approximately 6 megapixel to 8 megapixel.

Light Source and Markers

At least one light source is typically present in many prior art launch monitors. The light source is used to illuminate the ball and club in order to generate one or more images. In one aspect, a light source illuminates the golf club and ball. The light that reflects back from each object is imaged by the camera systems. Various forms of light source can be employed by the launch monitor. However, the type of camera system utilized will dictate in most cases the types of illumination that can be used by the launch monitors. In this aspect, the best orientation for the light is as close to in line with the camera as possible. The best location for the sun is behind the launch monitor. Indirect sunlight, shade, or a cloudy day, is better than direct sun because of shadows and specular reflection.

In one embodiment, the launch monitor can use ambient light to illuminate the golf objects. In such cases, the camera systems should be of the high speed video variety, preferably with electronic shutters that can generate intervals between the images ranging between 10-300 microseconds, which help to reduce motion blur. In another aspect, the launch monitor can use artificial continuous light. Slower camera systems (e.g., camera systems utilizing double exposure image capturing) can utilize strobe lights. In an aspect, systems utilizing strobe lights can use fluorescent markers (discussed below) on the golf objects.

In aspects of the systems utilizing color cameras, white light can be used for illumination. White light can be from any source, and eliminates the need for filters. These filters that are eliminated are used for color filtration, Utilizing color cameras allows for the separation of different colored markers from each other and from the background to be carried out with software. Any source of white light can be used, but brighter light is preferred. High speed photography requires high power light sources because of the short exposure times needed. For example, a continuous light source, like a high intensity discharge (HID) light, would provide bright illumination needed for high speed photography. In this aspect, the color cameras preferably are high speed, and have electronic shutters.

In one aspect, the launch monitor can be configured to utilize inherent visible properties of the golf objects to calculate the measurements. For example, side stamps, logos, and other prominent visible features of the golf ball can be captured by the camera systems and be the basis of the analysis. In such aspects, high speed video can be utilized.

In another aspect, a club and ball may be tagged using a set of markers. Such markers can include those disclosed in U.S. Pat. Nos. 8,016,688 and 7,744,480, both of which are incorporated by reference in their entirety. In combination with a camera system, this can be a powerful tool for analyzing the swing of a player. Typically, the markers placed on the equipment are selected to create a high contrast on the images of the swing captured by the camera. High intensity markers, including fluoresce markers, reflect light with a higher intensity than a white diffuse surface. Limited spectrum markers are excited by a specific spectrum of light, and only return light within a certain excitation wavelength. In an aspect, the present invention may be used with either high intensity markers or limited spectrum markers. In another embodiment, a combination of both types of markers may be used.

The present invention may be used with any types of markers. In some embodiments, as described above, limited spectrum markers may be used. In other embodiments, high intensity markers may be used. In another embodiment, markers or features that are inherent to the object are used. Under the proper conditions, retroreflective markers and fluorescent markers can reflect more light than a white diffuse surface. This feature of retroreflective markers and fluorescent markers is useful for creating higher contrast between the illuminated markers and the remainder of the image captured by the camera. By increasing the contrast, background noise such as reflections from surfaces other than from the markers can be reduced or eliminated completely. As such, in one embodiment, the markers include retroreflective markers, fluorescent markers, or combination thereof.

Since it is desirable to differentiate between the golf club and the golf ball, it is also desirable to place different markers on the golf club and golf ball. Accordingly, different markers can be used for marking the golf club and the golf ball. For example, a first set of markers is used for the golf club and a second (different) set of markers is used for the golf ball. In one embodiment, a first set of fluorescent markers is used for the golf club and a second (different) set of fluorescent markers is used for the golf ball. In such aspects, the different fluorescent markers are preferably excited by light from the same excitation wavelengths. In another embodiment, a first set of limited spectrum markers is used for the golf club and a second (different) set of limited spectrum markers is used for the golf ball. In yet another embodiment, a first set of high intensity markers is used for the golf club and a second (different) set of high intensity markers is used for the golf ball. In still another embodiment, a first set of retroreflective markers is used for the golf club and a second (different) set of retroreflective markers is used for the golf ball. Several examples of how different club markers and ball markers can be used to differentiate the club and ball are described in U.S. Pat. No. 8,512,160, the entire disclosure of which is incorporated by reference herein.

In one aspect, a plurality of markers may be placed at different points on the surface of the golf club. The different points may include the shaft, toe, heel, or sole of the club. In a preferred aspect, the placement of the markers is chosen to facilitate optical fingerprinting of the club. The placement of the markers may be varied in order to ensure that each club or ball is optically unique. Those skilled in the art will recognize that the placement of the markers may be varied by quantity, size, shape, and spatial location.

Trigger

In one aspect, it is desirable to capture images of the golf club before impact with the golf ball. Additionally, it is desirable to capture images of the golf ball in the moments after impact. As described above, this allows the kinematic characteristics of the club and ball to be calculated. In order to capture the desired images, the camera (and in cases where a light source needs to be) must be activated during the desired portions of the swing and the ball trajectory. In rudimentary systems, this was done by manually selecting the appropriate times for a player's swing speed. However, more advanced systems employ a triggering system that determines when the club and ball are in motion, and relays this information to the camera (and flash if needed) through a signaling system.

Various triggers can be utilized by the launch monitor to activate the camera systems and light source, if needed. In one embodiment, the various triggers are automatic and are activated by sensing motion. Such triggers can include, but are not limited to, laser sensors, ultrasonic sensors, acoustic sensors, Doppler shift sensors, and various other sensors that detect motion. In another embodiment, more than one trigger can be utilized. For example, separate triggering systems can be used to detect the club motion before hitting the golf ball and the impact and movement of the golf ball.

In one aspect, the camera and image analysis system can be used as the trigger. In such aspects, the camera systems can be configured to take continuous images while the analysis system monitors each image. If the image analysis system detects a movement of an object, it can activate the storage of the images, as well as the measurement analysis, Otherwise, if no motion is detected in the images, the images are not saved, and are dumped. This is applicable to high speed video cameras. In addition, high speed video cameras may have a pre-trigger function by which a rolling buffer of frames is continuously taken. When a trigger signal is received a number of frames taken before the trigger signal may be stored and analyzed. In this way, for example, an acoustic trigger that doesn't reach the launch monitor until after the ball has been struck may still be used to store images from the buffer that show the club before impact.

It is desirable to use a trigger that has a fast response time and high signal to noise ratio. This is desirable because the trigger controls the signaling of the camera. This includes all of the cameras of the camera subsystems utilized by the launch monitor of the present invention. In addition, a trigger with these qualities is desirable for controlling the strobe utilized by the camera systems configured for double exposure imaging. Thus, the position of the objects reflection within the image frame is dependent on trigger response. In one embodiment, an optically based trigger may be used. An optical trigger has a fast response time and a high signal to noise ratio, is accurate and precise, and is capable of functioning in conditions where ambient light levels are high. Such optical triggers can include, but are not limited to, a monochromatic or laser light. One such laser sensor is described by U.S. Pat. No. 6,561,917, which is incorporated by reference in its entirety. In another embodiment, an ultrasonic trigger may be used, One such ultrasonic trigger is described by U.S. Pat. No. 8,608,583, which is incorporated herein in its entirety.

Triggers commonly include an emitter and receiver. In some embodiments, the trigger may employ a passive reflector that further enhances signal to noise ratio which makes it robust in bright ambient light environments. In order to control the activation of the camera and the flashes, the trigger preferably includes a control circuit. In one aspect, the control circuit preferably includes a discrete logic device such as a field programmable gate array (FPGA), microprocessor, or digital signal processor. The discrete logic device allows the trigger to be reprogrammed. Because the trigger is being used with objects that are moving at a high velocity, it is preferable that the trigger is capable of performing real time control of the camera(s) and light sources if needed.

CPU

Figure 3:
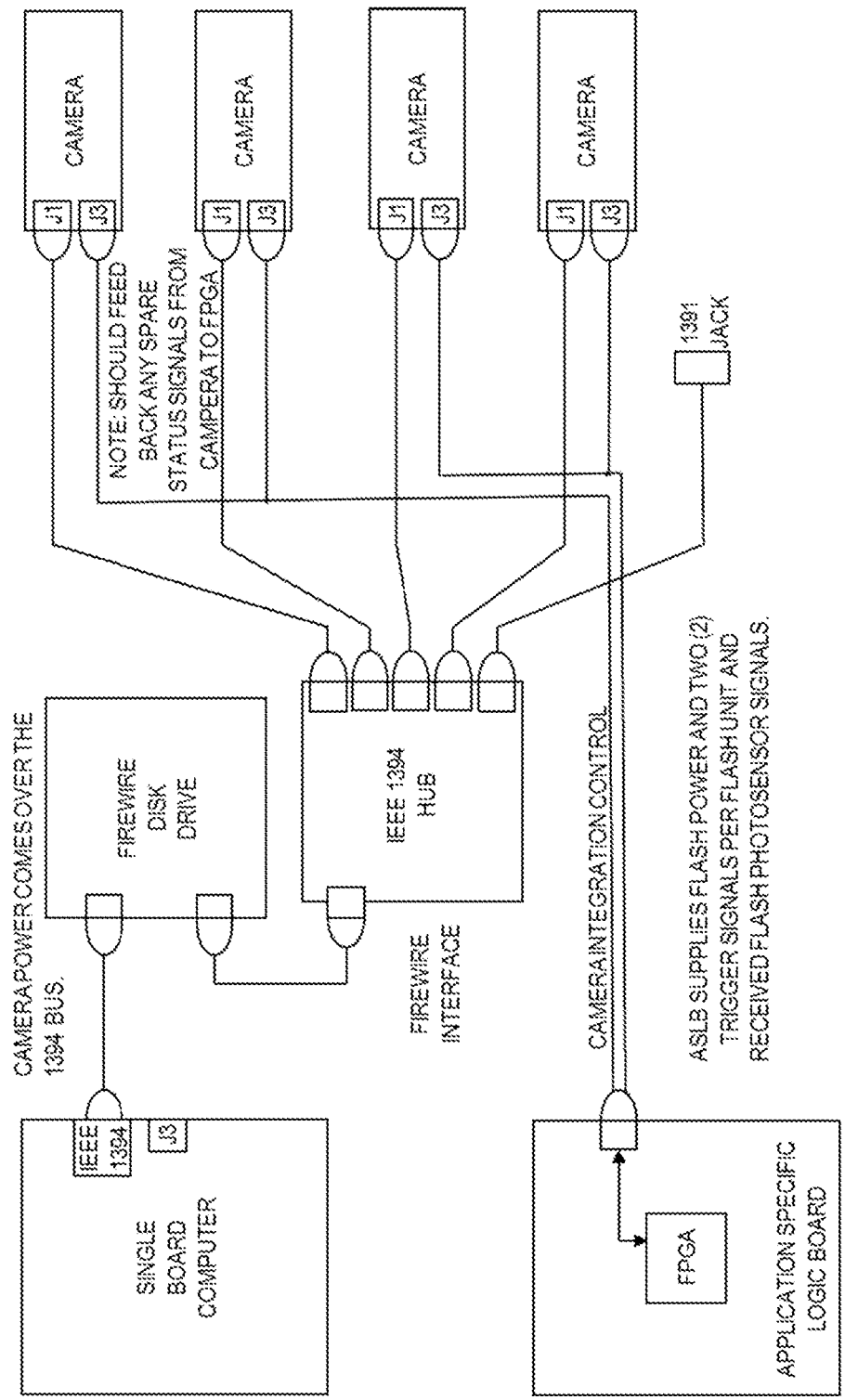
Figure 4:
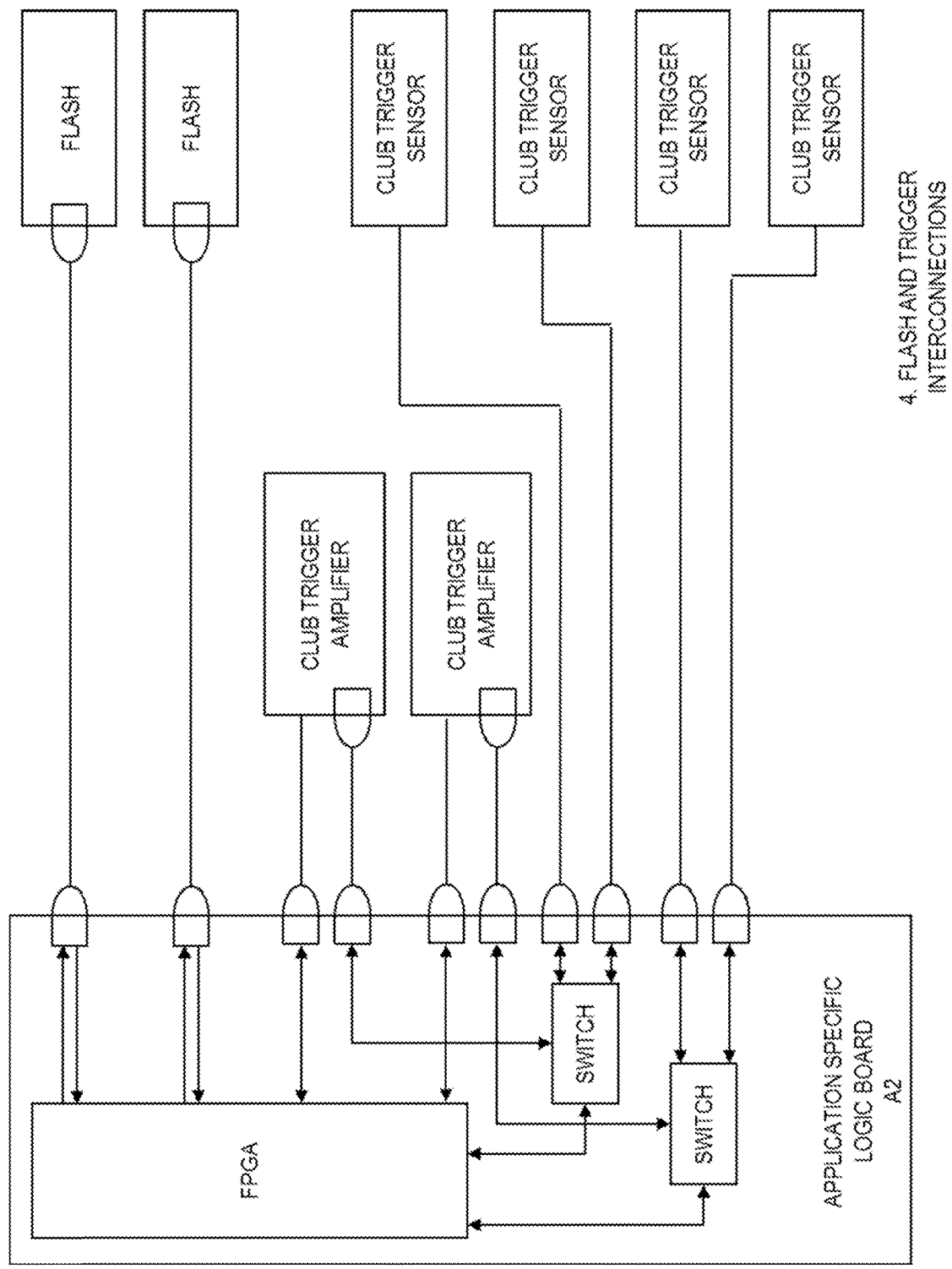
Figure 5:
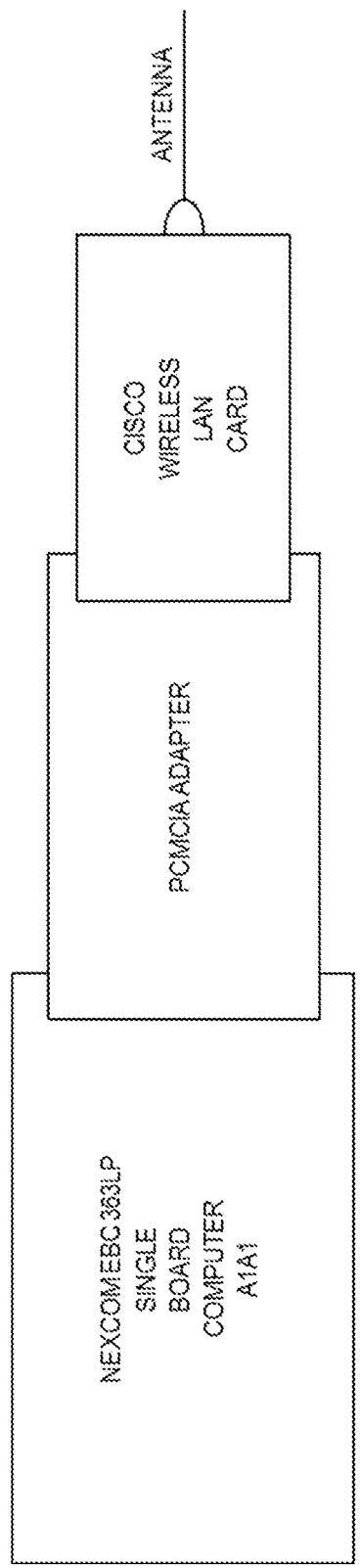

As described with respect to various aspects of the present invention, a processor is preferably included. In one embodiment, the processor may be a single board computer 301, as shown in FIG. 3, or an embedded controller using such as a Raspberry Pi, or an FPGA. In other aspects, the processor can be a part of a computer, laptop, desktop, or other computing device that is in communication with the other components of the monitor system, having an operating system including, but not limited to, Windows 7, Windows 10, Windows 10 IoT, or Lunux. FIGS. 1-5 are block diagrams that illustrate the major functional components in one embodiment of the present invention. The processor may be used to instruct the various functional components, including, but not limited to, image capture, image processing, image analysis, data calculation, and data output subsystems.

Image capture involves the timing of the trigger signals to the cameras, communication with the cameras and the transfer of images from the camera into the CPU's memory. Image processing involves identifying the object to be analyzed and the markings of interest, distinguishing them from the background. During image analysis, the pixel locations of markings in the image are converted into real world 3D locations using some form of calibration. Both image processing and image analysis can use software tools such as Halcon from MVTec, MIL by Matrox or a custom written library, and may be performed on stored images as well as images acquired from the cameras. Data calculation produces club and ball trajectory from the 3D location and timing data. Data output presents the trajectory data in a meaningful way on a screen. Data can also be output to a database, spreadsheet, text file or any other means of storage or presentation.

These processing systems are preferred because they are robust. In other words, relative to other available operating systems, they have been thoroughly tested for bugs and are relatively immune to frequent system crashes. These operating systems provide the additional advantage of having a short startup time. Though even a slow operating system does not require more than minutes to startup, a long startup time in addition to other setup requirements eventually becomes time consuming and even burdensome. Thus, it is desirable to use such operating systems in order to minimize the startup time.

In one embodiment, the processor is capable of performing a variety of functions. For example, the processor is capable of processing the acquired images and sending them to a memory. In addition, the processor executes the software that is necessary to analyze the images. For example, as discussed above, the processor can be configured to apply the color filters to the images captured by the color cameras. The processor is capable of performing any function known to those skilled in the art, including the generation of the kinematics information of the golf objects.

Accuracy

The swing speed of a club and, thus, the velocity of the ball, may vary based on the skill or experience of a player, or the type of club being used. Swing speeds may vary between about 30 and about 150 mph, and ball speeds may vary between about 30 and about 225 mph. When fitting low handicap golfers with a driver, variations in speed of about 2 mph, variations in spin of about 150 rpm, and variations in angle of about 0.5 degrees lead to appreciable performance variation. Thus, when attempting to calculate kinematics of objects moving at such a high velocity, it is important that accurate spatial and time information is obtained. Accurate speed information is ensured by calibrating the camera system. Accurate time information is delivered by a system clock of the camera system, the processor, or both.

Imaging system resolution is dependent on imaging sensor resolution and size, as well as lens and filter characteristics. In one embodiment, resolution of the imaging system is preferably greater than about 1 line pairs per millimeter (lp/mm). In another embodiment, image resolution is greater than about 2 lp/mm. In yet another embodiment, image resolution is greater than about 5 lp/mm. The image resolution may be measured using a USAF target available from Edmund Industrial Optics.

In one embodiment, the estimated time between subsequent images is accurate to within about 10 microseconds. In another embodiment, the estimated time between subsequent images is accurate to within about 5 microseconds. In yet another embodiment, the estimated time between subsequent images is accurate to within about 3 microseconds.

The exposure duration, or shutter speed, (as covered above) can adversely affect accuracy due to the fact that optical blur associated with object motion induces error in spatial estimation. In one embodiment, exposure duration is less than about 75 microseconds. In another embodiment, the exposure duration is less than about 30 microseconds. In yet another embodiment, the exposure duration is less than about 10 microseconds. Exposure duration may be controlled by the strobe burn time, shutter open time, or time that the image sensor is active.

In embodiments which use a strobe it is also desirable to control the duration of the flash. In one embodiment, the flash duration is about 100 microseconds or less. In another embodiment, the flash duration is about 50 microseconds or less. In yet another embodiment, the flash duration is about 30 microseconds or less.

Three Dimensional Image Generation and Measurement

Once the camera system has been activated to capture the images of the golf objects (i.e., images of the golf club before impact with the ball and images of the golf ball after impact with the golf club), the image processing will then determine the golf ball measurements needed to generate the kinematics data. In an aspect, the image processing system will take the captured images and generate three dimensional images. Three dimensional images of both the golf ball and the golf club can be generated. In order to generate the three dimensional images, the image processing system must be able to find points within three dimensions. By utilizing stereographic imaging (i.e., two different cameras) and epipolar geometry, or light-field imaging (capturing intensity and direction of light—including depth), points in three dimensions can be generated. Producing three dimensional images using stereographic imaging uses a pair of corresponding (i.e., taken at the same time) images and using epipolar geometry and is well known in the art. As discussed above, light-field images include not only 2D images, but also depth information, based upon the direction of the light. Therefore, the images can be generated into 3D models with corresponding coordinates.

In one embodiment, the image processing system will generate a series of 3D images based upon the sequential images sent by the camera systems. In other words, the image processing system will generate 3D images based upon the adjacent frames sent. In an exemplary aspect, the image processing system will generate at least three consecutive 3D images. The system will then measure the distance of markers of the golf objects between the three images. More specifically, the system will take the three dimensional coordinates (x, y, z) of the markers and see the distance moved between adjacent frames. For example, an object in the 3D image generated from frame 1 has coordinates of $x_{f1}$, $y_{f1}$, and $z_{f1}$. In frame 2, the object has coordinates of $x_{f1}$, $y_{f1}$, and $z_{f2}$. The difference between the coordinates will generate the distance traveled ($d_{f1\text{-}f2}$) in 3D. From here, the velocity ($vf_{1\text{-}2}$) of the golf objects can be determined by dividing the distance by the interval between frames. The same can be done for distance ($d_{f2\text{-}f3}$) and velocity ($vf_{2\text{-}3}$) between frames 2 and 3. The acceleration of the golf object can then be determined from the difference in velocities ($vf_{1\text{-}2}$)–($vf_{2\text{-}3}$) and frame rate. This process can be repeated on subsequent frames in order to measure/track acceleration/deceleration of the golf objects.

In an aspect, the ball velocity and the club velocity may be determined to within plus or minus about 5 mph. In another aspect, the velocities may be determined to within plus or minus about 1 mph. In yet another aspect, the velocities may be determined to within plus or minus about 0.5 mph, Most preferably, the velocities may be determined to between plus or minus about 0.1 mph or less.

By generating and measuring the distance traveled by the golf objects between frames in all three directions, the launch monitor provides more accurate kinematic information. For example, other systems will capture x and y points from 2D images, but will then project the z coordinates based upon the change in size of the golf object. In these cases, in order to generate the distance traveled in the z plane, assumptions must be made upon the golf object. Specifically, the systems must assume a standard measurement or size of the golf object. If the golf object is a little off, or the images cannot provide a solid edge, there is a strong possibility of an error being made in generating the distance traveled in the z direction.

With these measurements, other kinematic characteristics can be generated. Golf club kinematic information can include club head speed, club head acceleration, club head path angle, club head attack angle, club head loft, club head droop, club head face angle, club head face spin, club head droop spin, club head loft spin, ball impact location on the golf club face, horizontal impact position, and vertical impact position. In another aspect, the golf ball kinematic information can include ball speed, ball acceleration, ball azimuth angle, launch angle, side angle, ball back spin, ball rifle spin, ball side spin, total spin, estimated trajectory, and ball impact location on the golf club face.

In some applications, it may be desirable to determine the backspin of a ball in order to determine the trajectory. The backspin can be calculated from the motion of the markers on the surface of the ball relative to the center of the ball. In one embodiment, the backspin of the ball is determined to within plus or minus about 500 rpm. In another embodiment, the backspin of the ball is determined to within plus or minus about 200 rpm. In yet another embodiment, the backspin of the ball is determined to within plus or minus about 50 rpm or less.

Another measurement that commonly affects the trajectory is sidespin. The sidespin of the ball may be determined to within plus or minus about 500 rpm. In one embodiment, the sidespin is determined to within plus or minus about 250 rpm. In yet another embodiment, the sidespin is determined to within plus or minus about 50 rpm or less. Other characteristics of the club that may be determined are the path angle, attack angle, face angle, loft angle, and droop angle. Each of these may be determined to about 1 degree or less. In one embodiment, each of these may be determined to about 0.5 degrees or less. In another embodiment, each of these may be determined to about 0.25 degrees or less.

VARIOUS EMBODIMENTS

Figure 6:
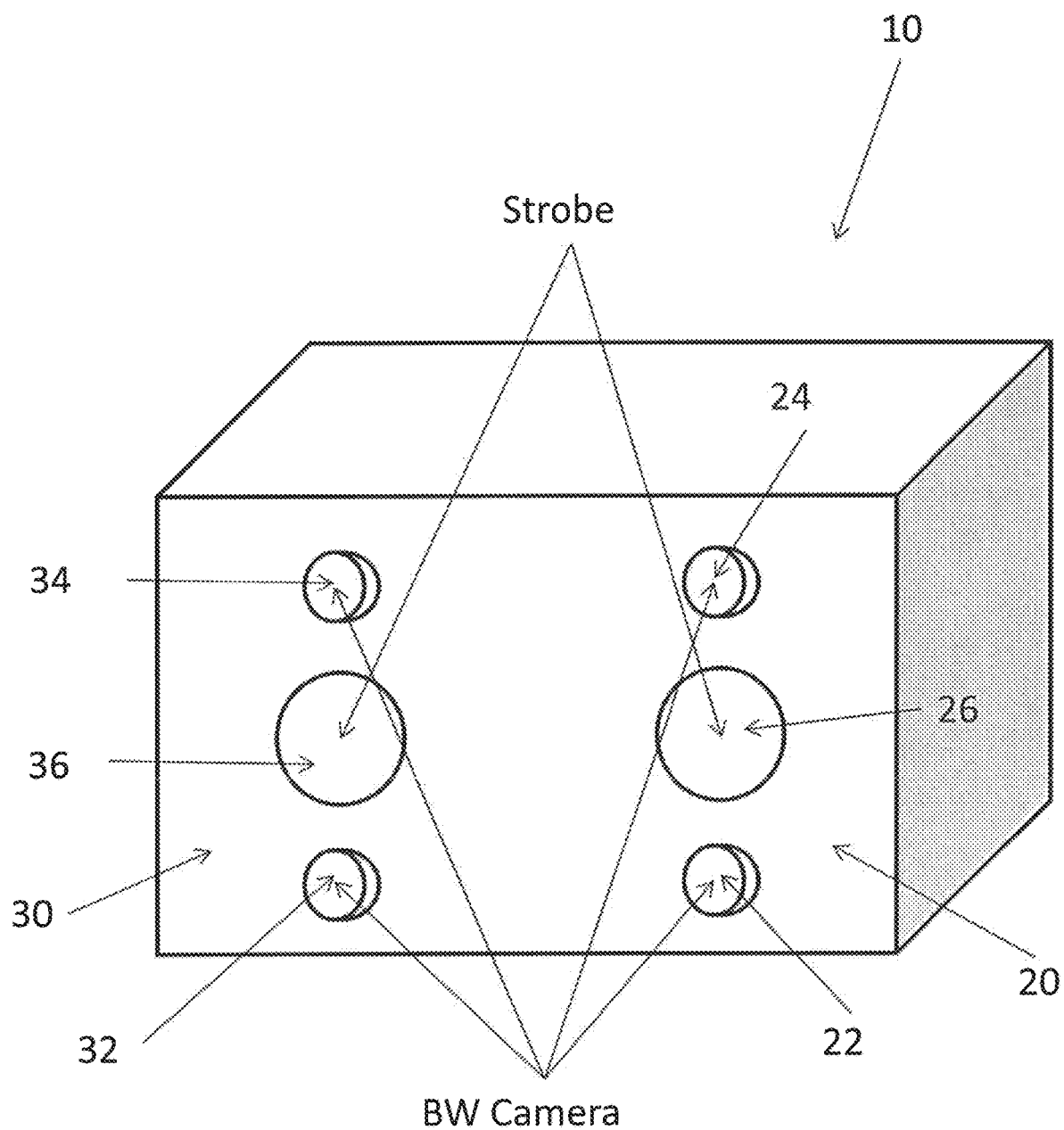
FIGS. 6-21 illustrate launch monitors according to an aspect of the present invention.
Figure 7:
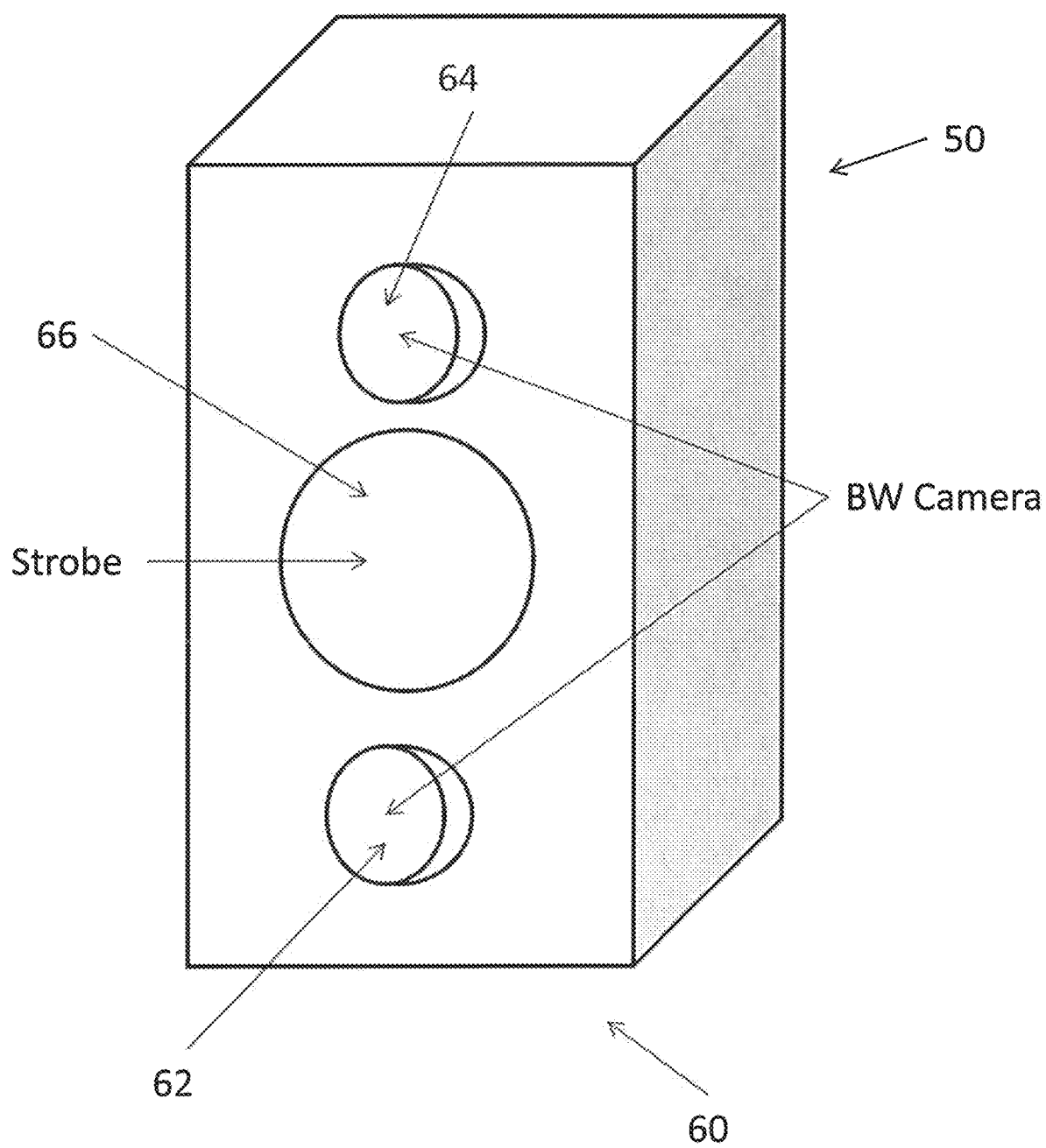

Various embodiments can encompass the inventive concepts discussed above. Below are exemplary embodiments that illustrate the various combinations of concepts. FIG. 6 illustrates a launch monitor 10 that utilizes two camera subsystems 20, 30, with each camera subsystem 20, 30 including a first camera 22, 32, a second camera 24, 34, and a strobe light 26, 36. The cameras 22, 24, 32, 34 utilize black and white (BW) cameras, with a strobe 26, 36 for each set 20, 30 being set up to produce double exposures of the various objects in motion. In such an embodiment, each subsystem 20, 30 is set up in stereo, as discussed above. The two camera subsystem 20, 30 calculate 3D positions of golf clubs and golf balls respectively. Such 3D positions can be used to measure the club and ball kinematics FIG. 7 illustrates a launch monitor 50 configured to measure the kinematics of either a golf club or a golf ball. The launch monitor 50 includes one camera subsystem 60. The camera subsystem 60 includes a pair of cameras 62, 64 set up in stereo with one another and a strobe 66. In an aspect, the cameras 62, 64 can include BW cameras. The subsystem 60 is configured to capture doubled exposed images. Markers on the ball or club can be used to calculate 3D positions of either to calculate the kinematics of either.

Figure 8:
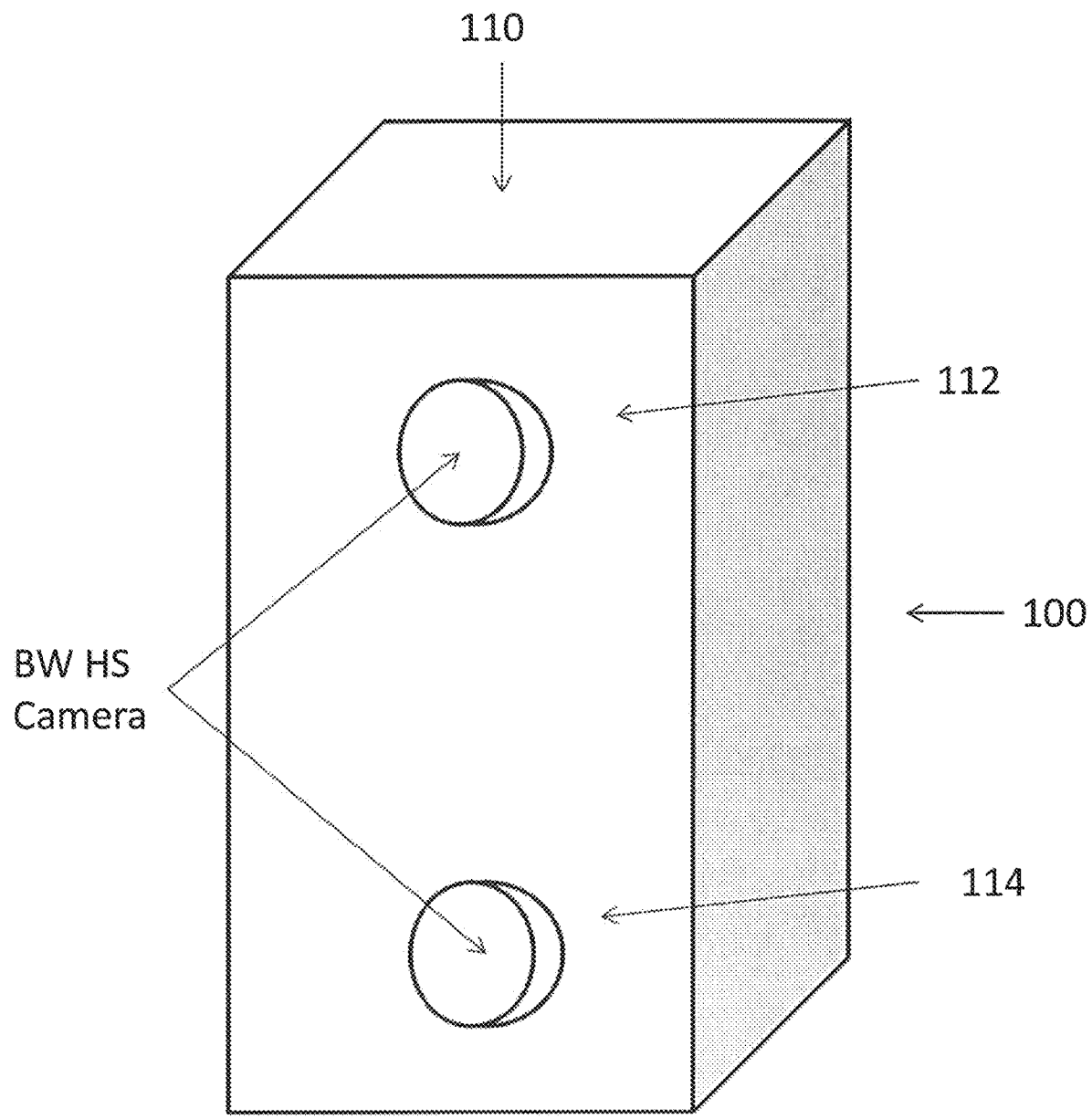

FIG. 8 illustrates a launch monitor 100 configured to measure the club or ball kinematics, including acceleration of either. In an aspect, the launch monitor 100 includes a camera subsystem 110 that includes two high speed (HS) cameras 112, 114 set up in stereo with one another. The cameras 112, 114 can include BW HS cameras 112, 114 configured to capture multiple black and white images at a fixed time interval (frame rate). The camera subsystem 110 allows for 3D images to be generated in order to calculate 3D positions of markers on either a golf ball or club. From the combination of change in distance and the known time interval, the kinematics of the golf club or ball can be determined, including acceleration.

Figure 9:
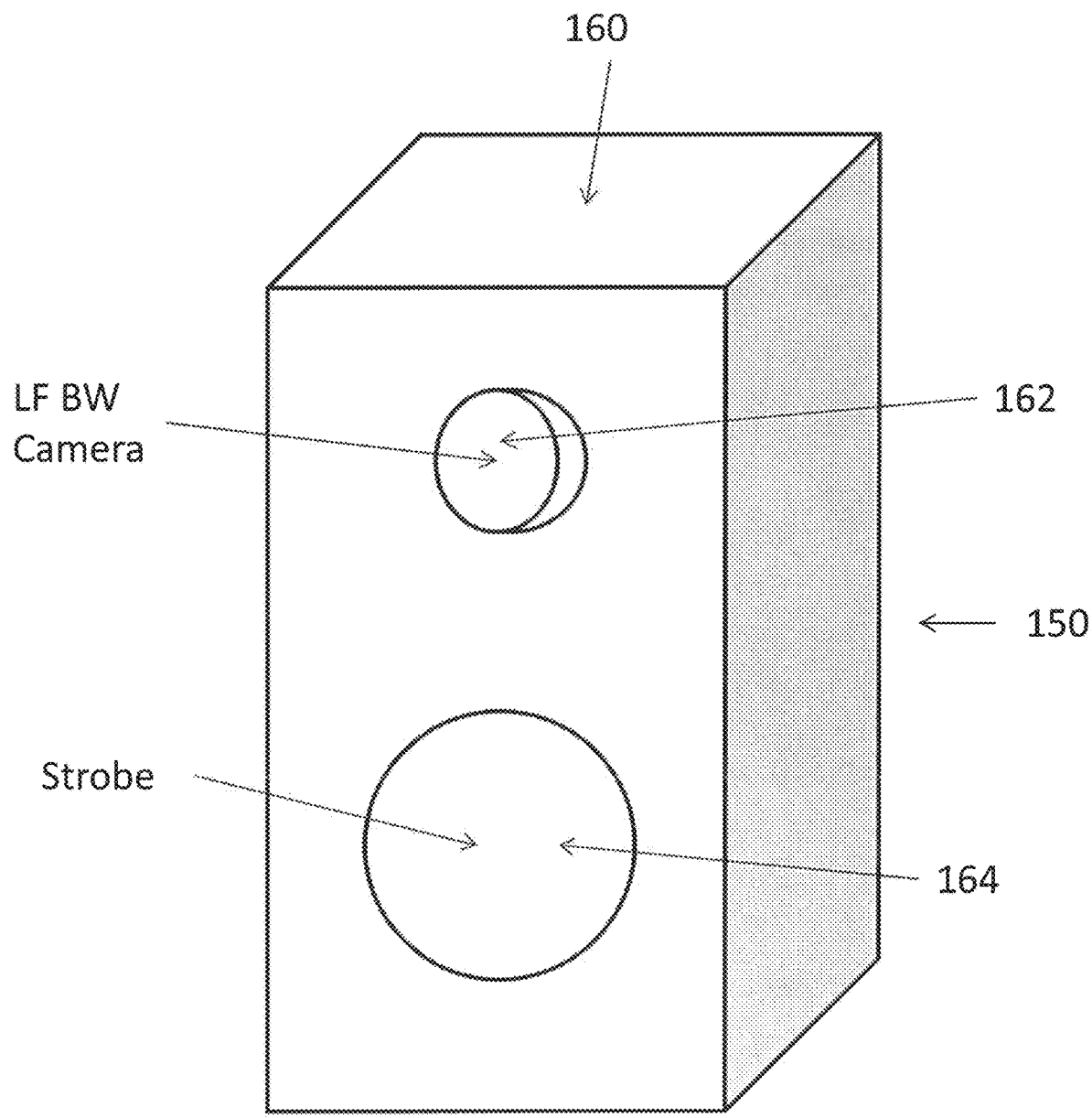

FIG. 9 illustrates a launch monitor 150 configured to measure the kinematics of either a golf club or golf club utilizing a light field camera subsystem 160. The subsystem 160 includes a light field (LF) camera 162 and a strobe 164. In an aspect, the LF camera 162 is a BW LF camera 162. The LF camera 162, in connection with the strobe 164, is configured to capture double exposed black and white images that can be utilized to calculate 3D positions of markers on either the golf club or golf ball. The 3D images can then be used to determine the kinematics of the golf objects monitored.

Figure 10:
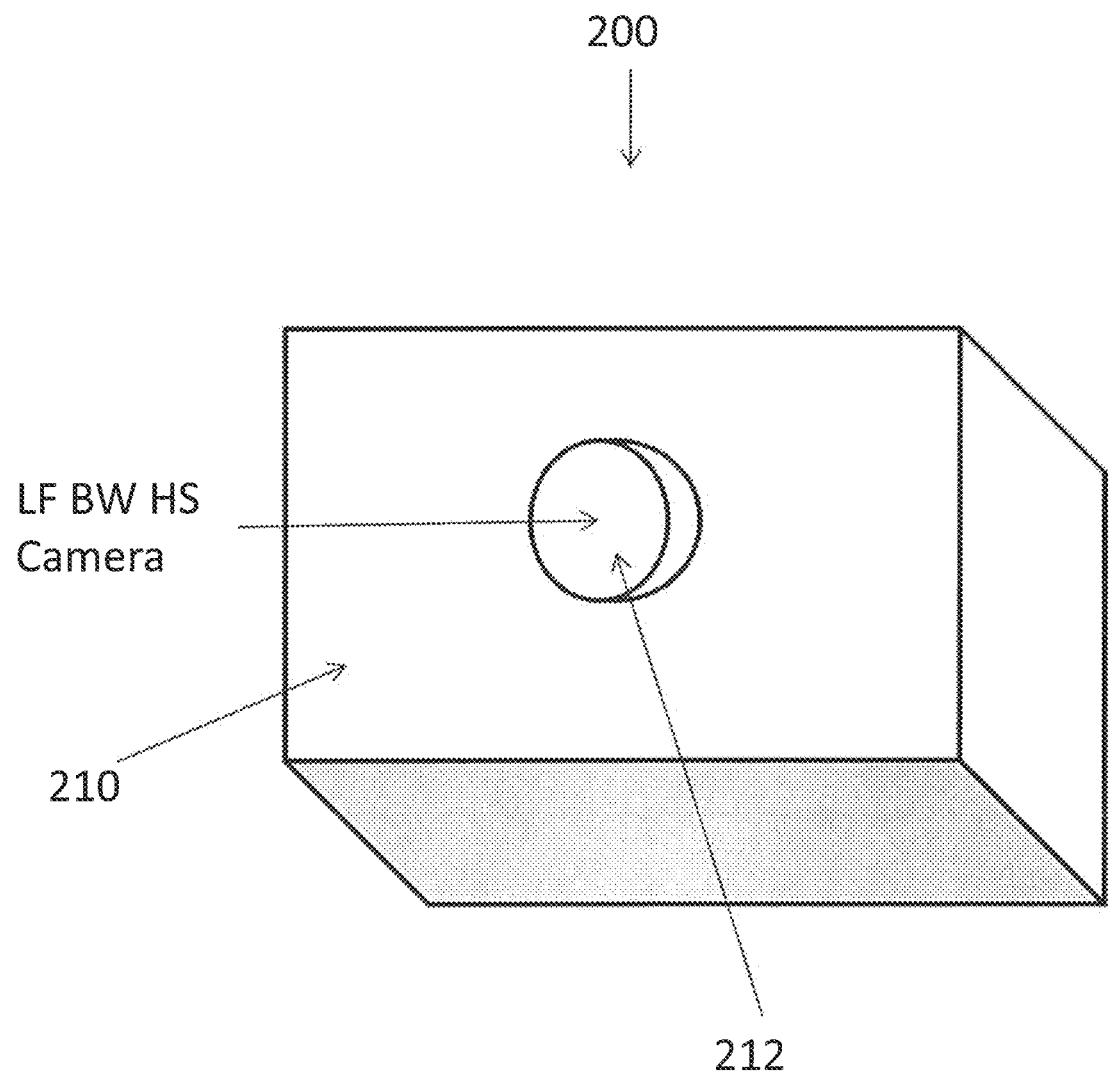

FIG. 10 illustrates a launch monitor 200 configured to measure the kinematics and acceleration of a golf club or golf ball according to an aspect. The launch monitor 200 includes one camera subsystem 210 with a single HS LF camera 212. The HS LF camera 212 can be a BW HS LF camera 212. The HS LF camera 212 is configured to capture multiple images at a fixed time interval, which can be used to capture 3D positions of markers on the golf object. From the 3D positions, the kinematics and acceleration of the golf club/ball can be determined.

Figure 11:
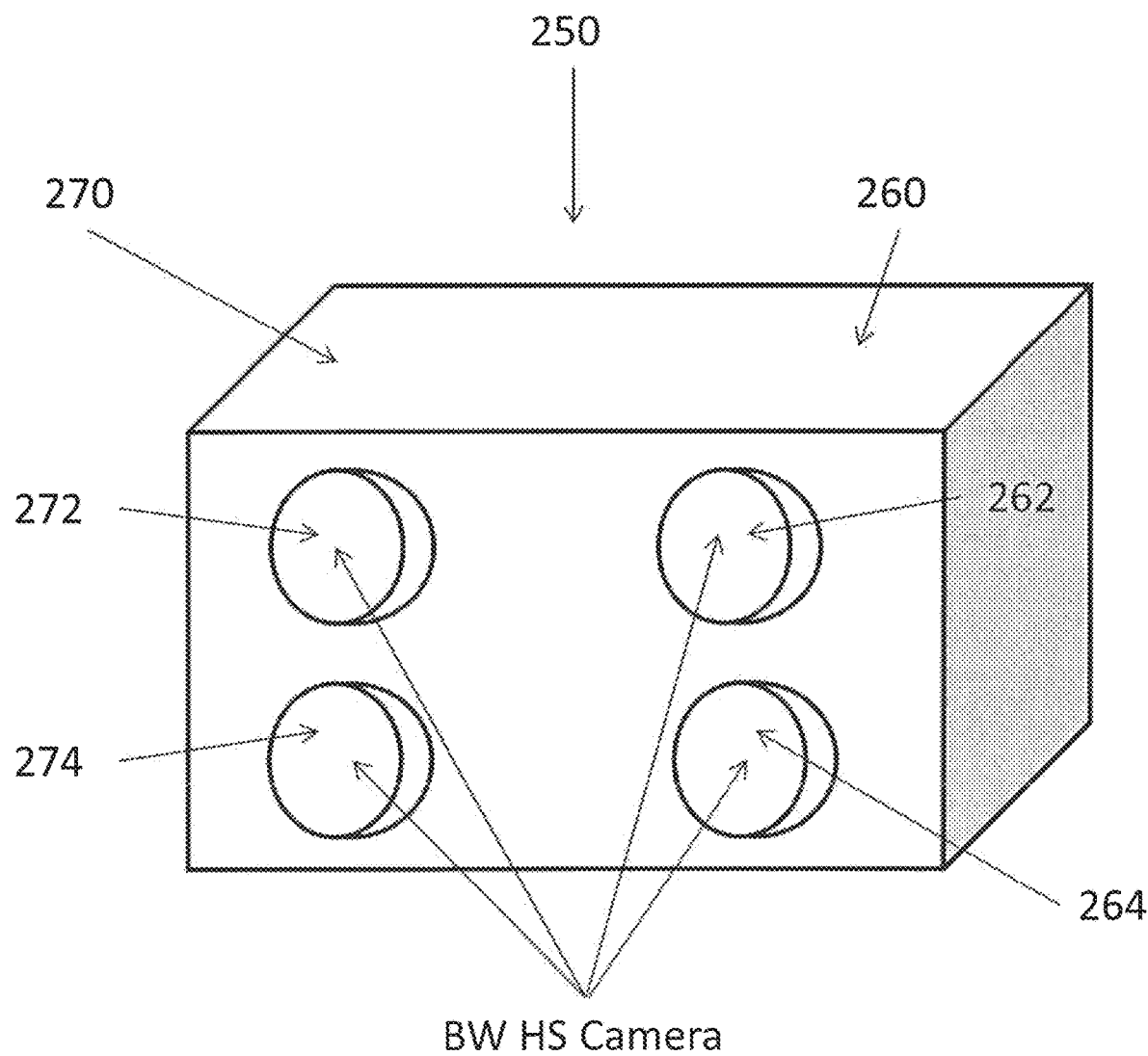

FIG. 11 illustrates a launch monitor 250 configured to measure the kinematics of both a golf club and golf ball together. The launch monitor 250 includes a first and second camera subsystem 260, 270. In an aspect, each camera subsystem includes a pair of HS cameras 262, 264, 272, 274 set up in stereo. The HS cameras 262, 264, 272, 274 are configured to capture 3D positions of markers on both the golf club and golf ball. From the 3D positions, the kinematics of both the golf club and golf ball can be measured since there are a set of two camera subsystems 260, 270 being utilized.

Figure 12:
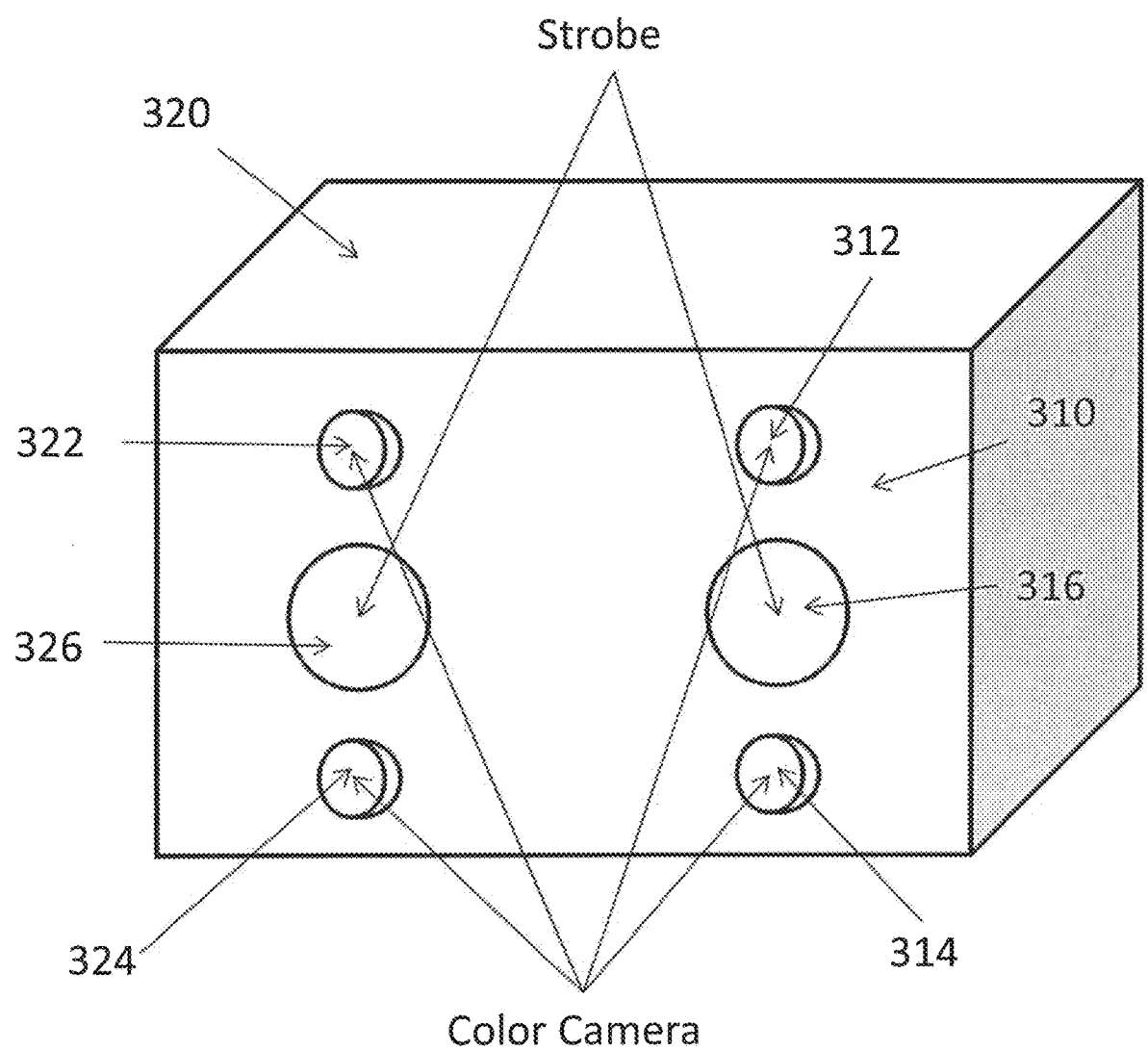

FIG. 12 illustrates a launch monitor 300 configured to measure the kinematics of both a golf club and golf ball. In an aspect, the launch monitor 300 includes two camera subsystems 310, 320. Each camera subsystem employs a first and second color camera 312, 314, 322, 324 with a strobe 316, 326, with the first and second cameras set up in stereo with each other. The camera subsystems 310, 320 capture double exposed color images. Of 3D positions of markers on the golf club and golf ball respectively. Using two sets of stereo cameras allow use of lower resolution cameras. The 3D positions can be used to determine the kinematics of the golf club and golf ball.

Figure 13:
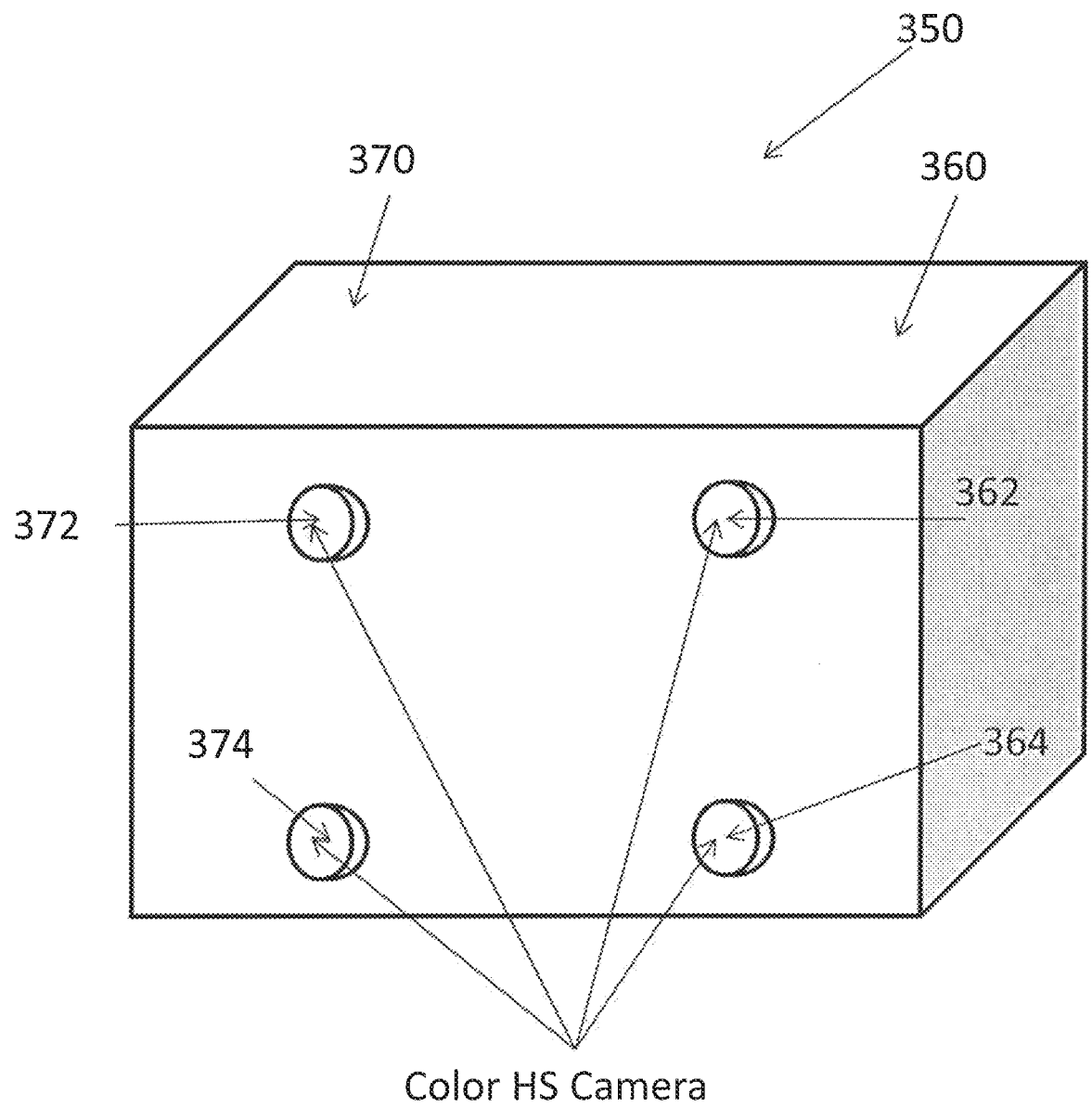

FIG. 13 illustrates a launch monitor 350 configured to measure the kinematics and acceleration of both a golf club and golf ball. In an aspect, the launch monitor 350 includes two camera subsystems 360, 370 employing HS cameras 362, 364, 372, 374. Each camera subsystem employs a first HS color camera 362, 364 with a second HS color camera 364, 374 in stereo with one another. The camera subsystems 360, 370 capture multiple color images at a fixed time interval (frame rate) to calculate 3D positions of markers. The two sets of stereo cameras allow use of lower resolution cameras to determine the kinematics and acceleration of the golf club and golf ball.

Figure 14:
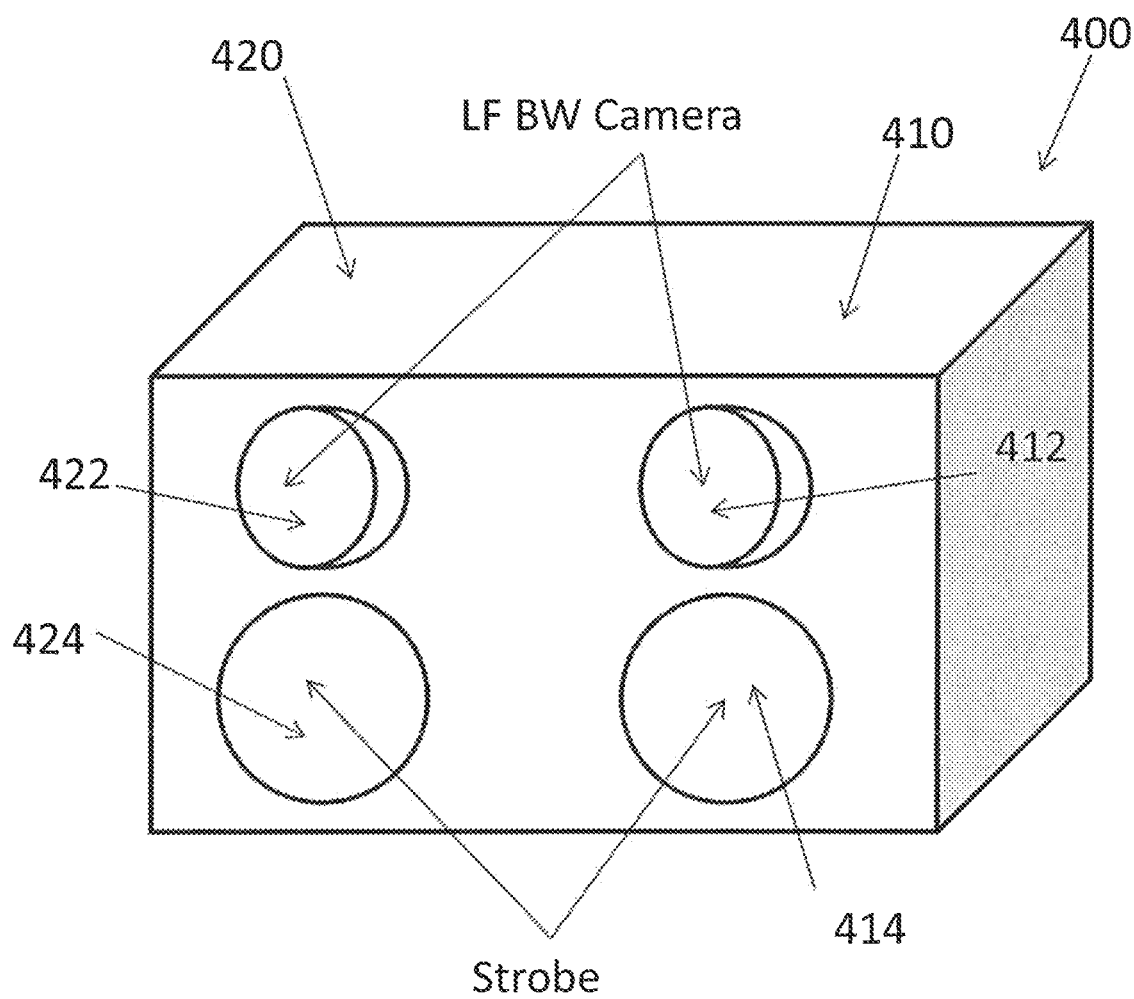

FIG. 14 illustrates a launch monitor 400 configured to measure the kinematics of both a golf club and golf ball. In an aspect, the launch monitor 400 includes two camera subsystems 410, 420, each employing a LF camera 412, 422 with a strobe 414, 424. In an aspect, the LF cameras 412, 422 are BW LF cameras. The LF camera subsystems 410, 420 are configured to capture double exposed black and white images of golf clubs and golf balls. From these double exposed images the 3D positions of markers on both golf objects can be determined in order to determine their respective kinematics.

Figure 15:
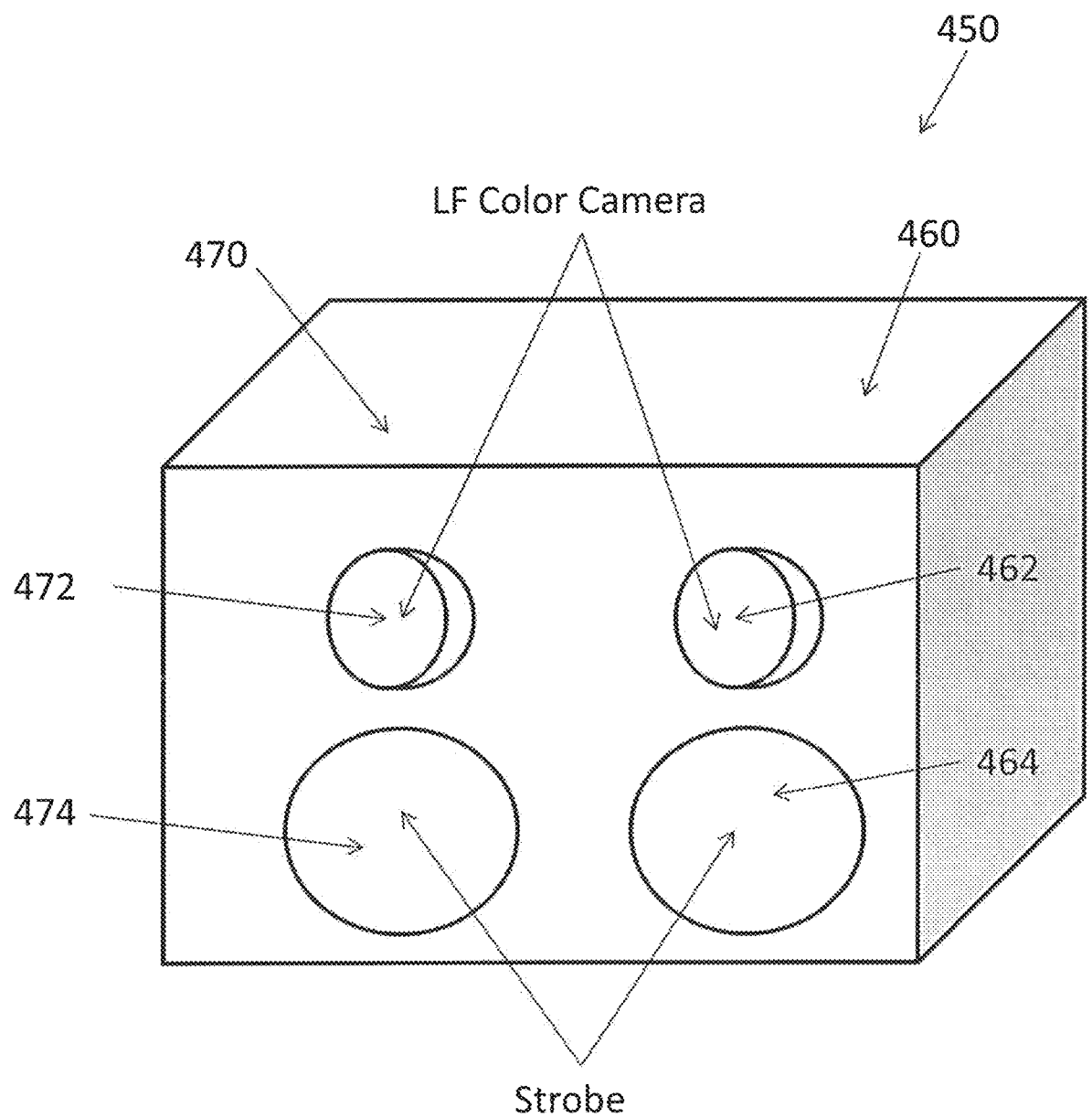

FIG. 15 illustrates a launch monitor 450 configured to measure the kinematics and acceleration of both a golf club and golf ball. In an aspect, the launch monitor 450 includes two camera subsystems 460, 470, each employing a color LF camera 462, 472 with a strobe 464, 474. The camera subsystems 460, 470 capture double exposed color images to calculate 3D positions of markers. The two sets of color LF cameras 462, 472 allow use of lower resolution cameras to determine the kinematics of the golf club and golf ball.

Figure 16:
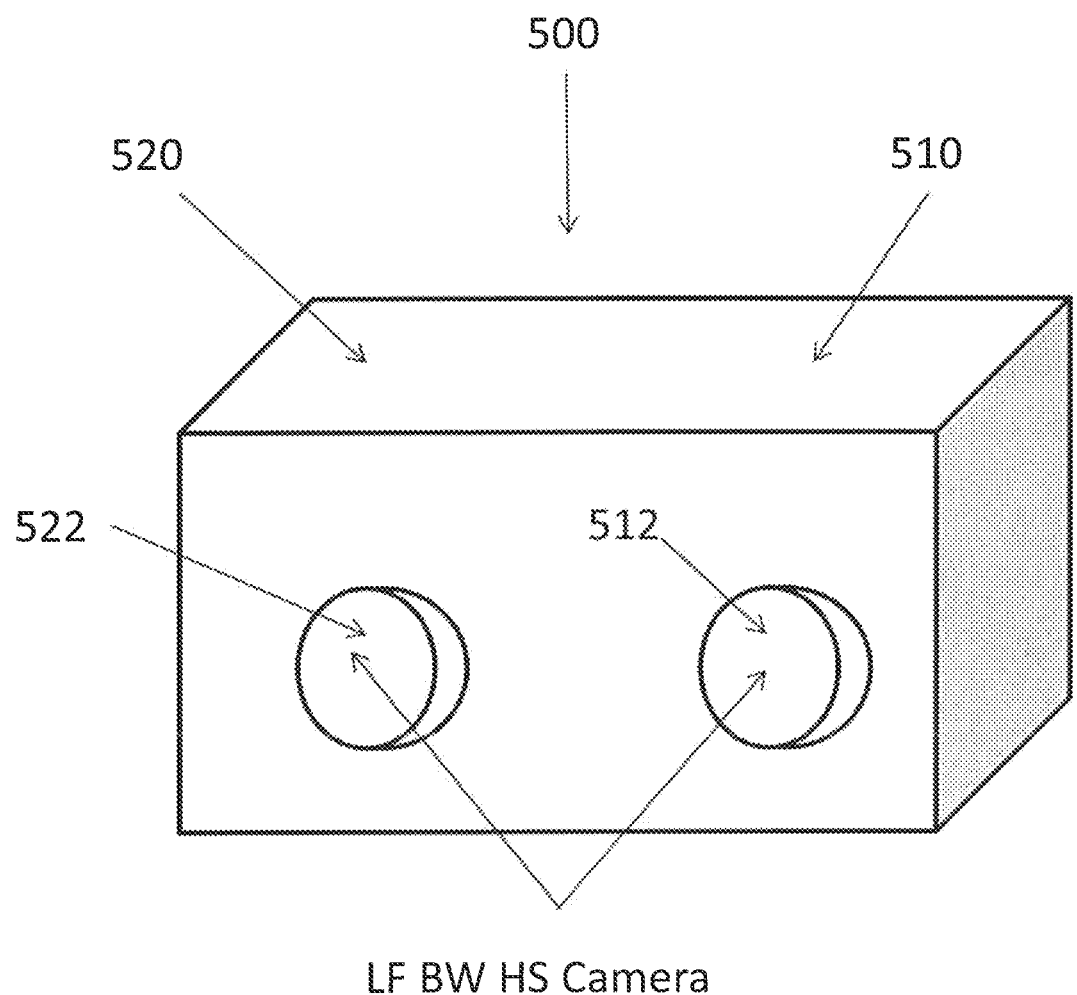

FIG. 16 illustrates a launch monitor 500 configured to measure the kinematics and acceleration of both a golf club and golf ball. In an aspect, the launch monitor 500 includes two camera subsystems 510, 520, each employing a HS LF BW camera 512, 522. Each HS LF BW camera 512, 522 captures multiple black and white images at a fixed time interval (frame rate). The light field cameras 512, 522 are used to calculate 3D positions of markers on both golf club and golf balls in order to measure their respective kinematics and acceleration.

Figure 17:
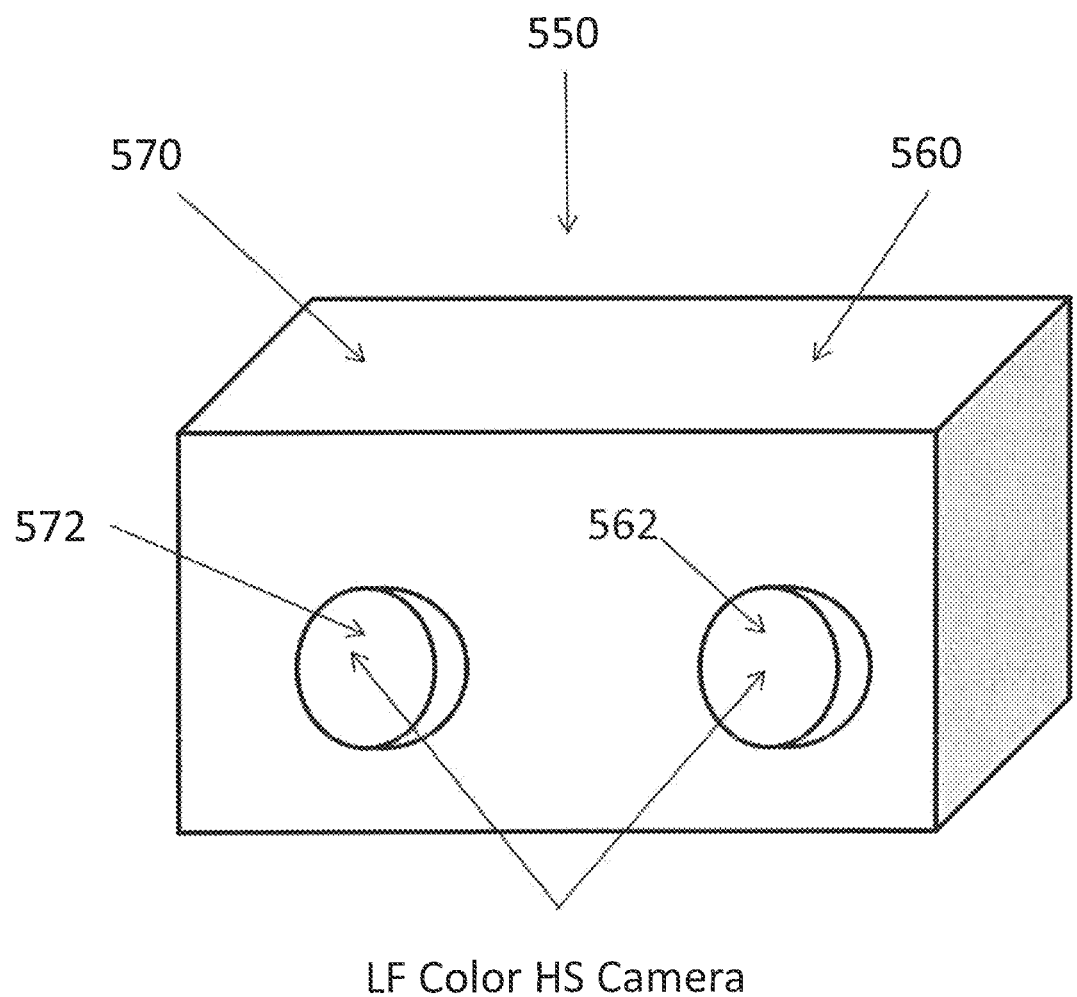

FIG. 17 illustrates a launch monitor 550 configured to measure the kinematics and acceleration of both a golf club and golf ball. In an aspect, the launch monitor 550 includes two camera subsystems 560, 570 each employing a HS color LF camera 562, 572. The camera subsystems 560, 570 capture multiple color images at a fixed time interval (frame rate) to calculate 3D positions of markers. The two HS color LF cameras allow use of lower resolution cameras to determine the kinematics and acceleration of the golf club and golf ball.

Figure 18:
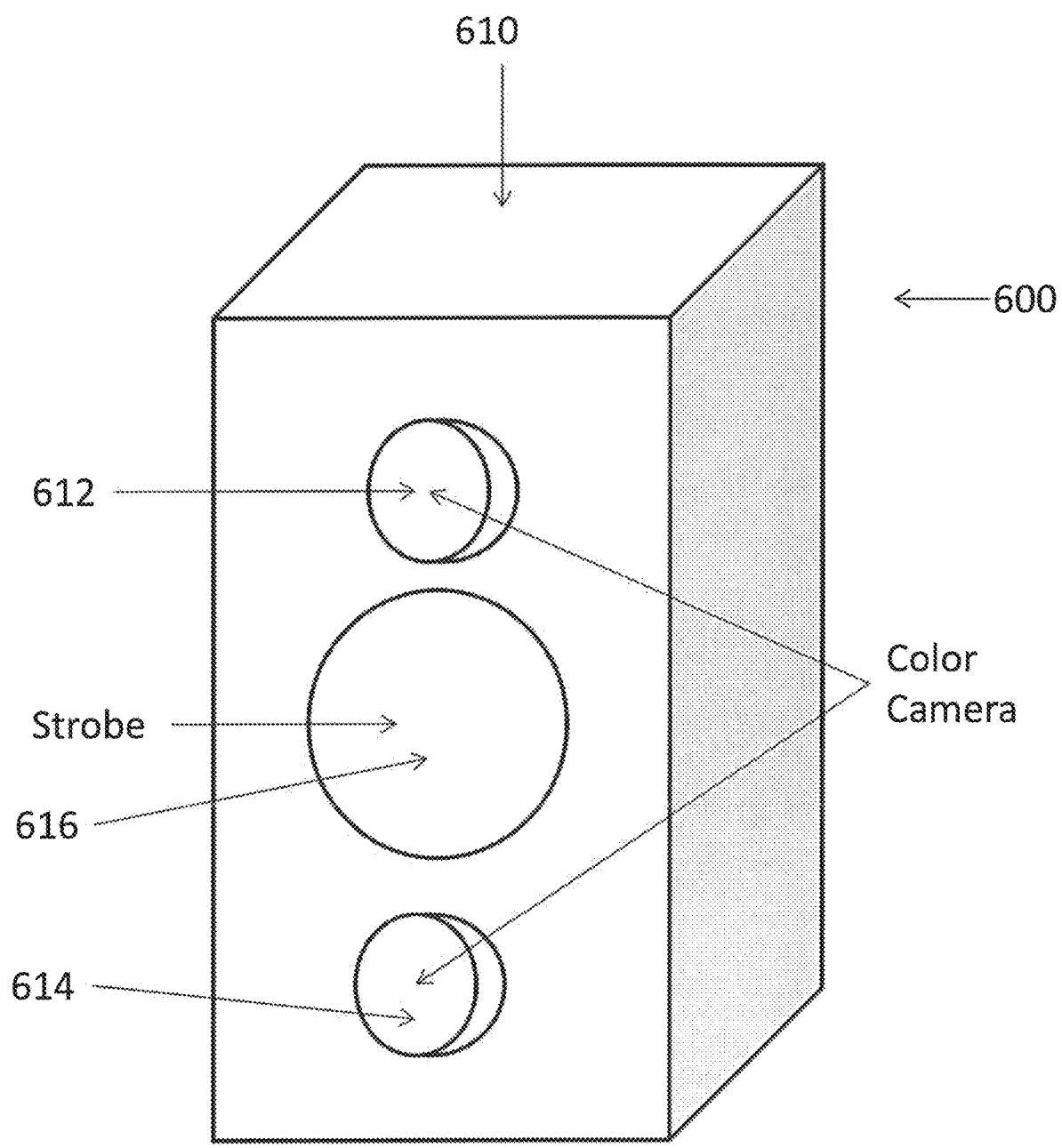

FIG. 18 illustrates a launch monitor 600 configured to measure the kinematics of either a golf club or a golf ball. The launch monitor 600 includes one camera subsystem 610. The camera subsystem 610 includes a pair of color cameras 612, 614 set up in stereo with one another and a strobe 616. The subsystem 610 is configured to capture doubled exposed images. Markers on the golf ball or golf club can be used to calculate 3D positions of either to calculate the kinematics of either. Such a system could also capture images of both the club and ball and, thus, measure the kinematics of both the club and the ball.

Figure 19:
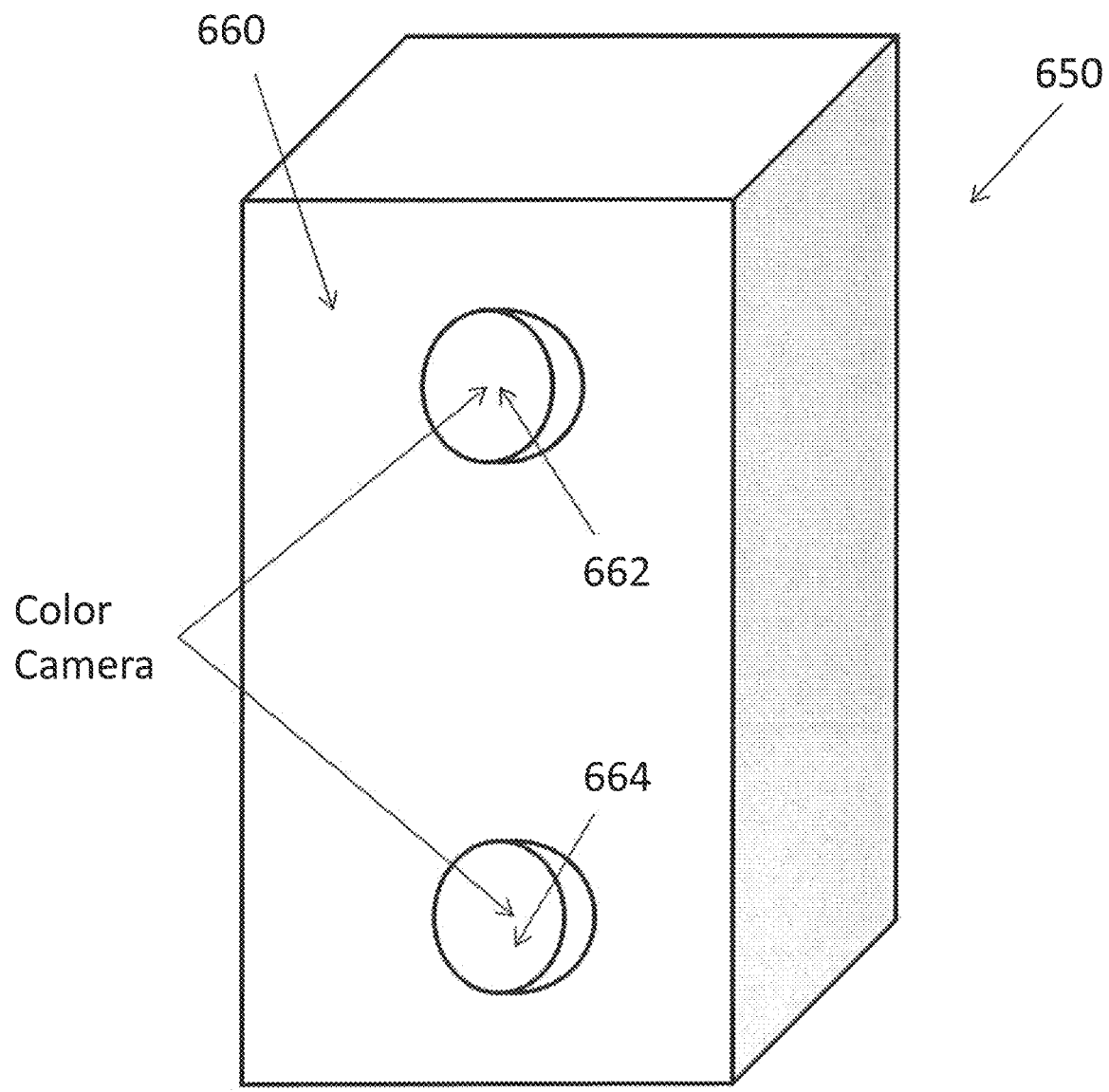

FIG. 19 illustrates a launch monitor 650 configured to measure the golf club or golf ball kinematics, including acceleration. In an aspect, the launch monitor 650 includes a camera subsystem 660 that includes two color HS cameras 662, 664 set up in stereo with one another. The color HS cameras 662, 664 are configured to capture multiple color images at a fixed time interval (frame rate). The camera subsystem 660 allows for 3D images to be generated in order to calculate 3D positions of markers on either a golf ball or club. From the combination of change in distance and the known time interval, the kinematics and acceleration of the golf club or ball can be determined. Such a system could also capture images of both the club and ball and, thus, measure the kinematics of both the club and the ball.

Figure 20:
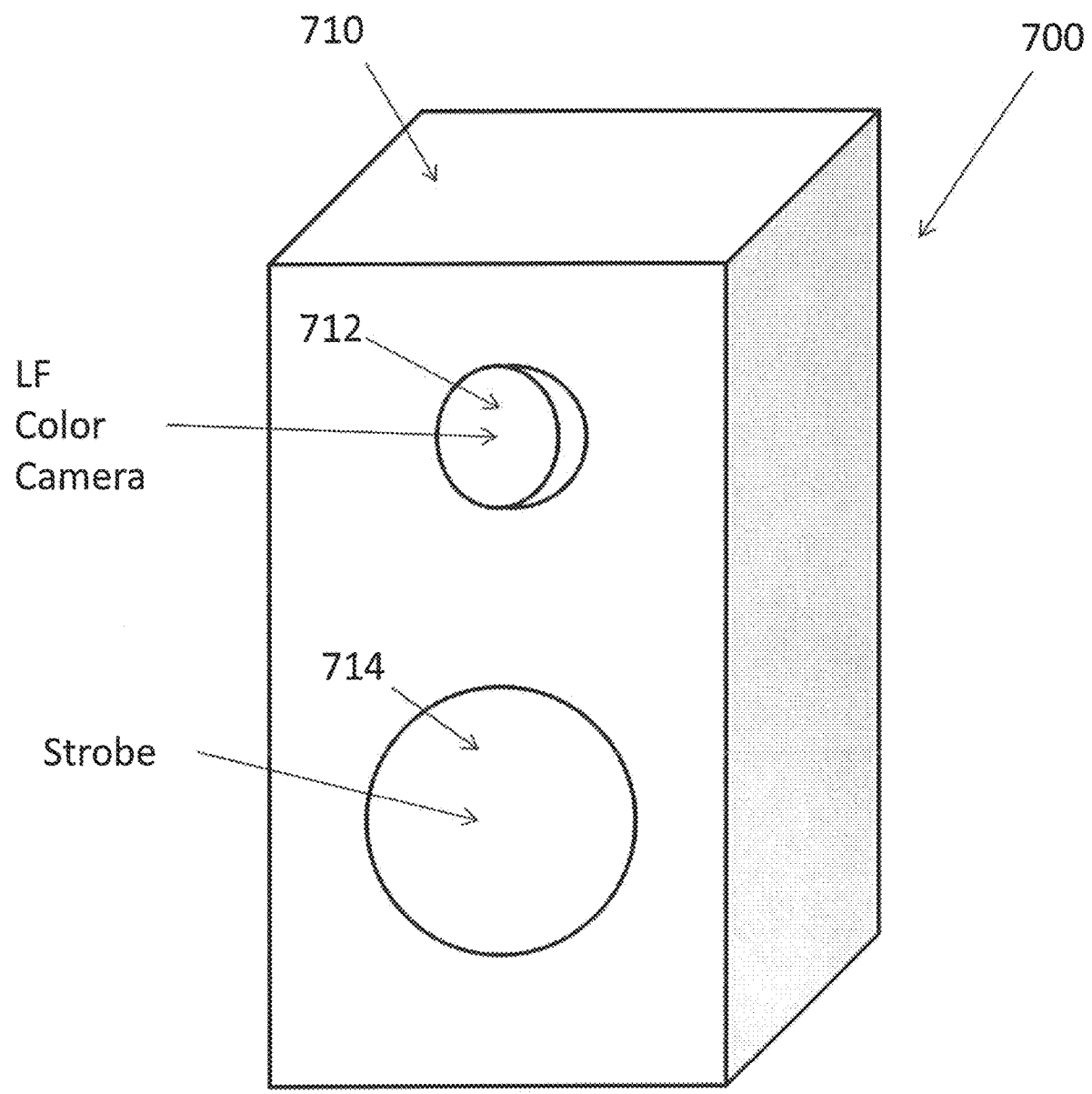

FIG. 20 illustrates a launch monitor 700 configured to measure the kinematics of either a golf club or golf club utilizing a LF camera subsystem 710. The subsystem 710 includes a color LF camera 712 and a strobe 714. The color LF camera 712, in connection with the strobe 714, is configured to capture double exposed color images that can be utilized to calculate 3D positions of markers on either the golf club or golf ball. The 3D images can then be used to determine the kinematics of the golf objects monitored. Such a system could also capture images of both the club and ball and, thus, measure the kinematics of both the club and the ball.

Figure 21:
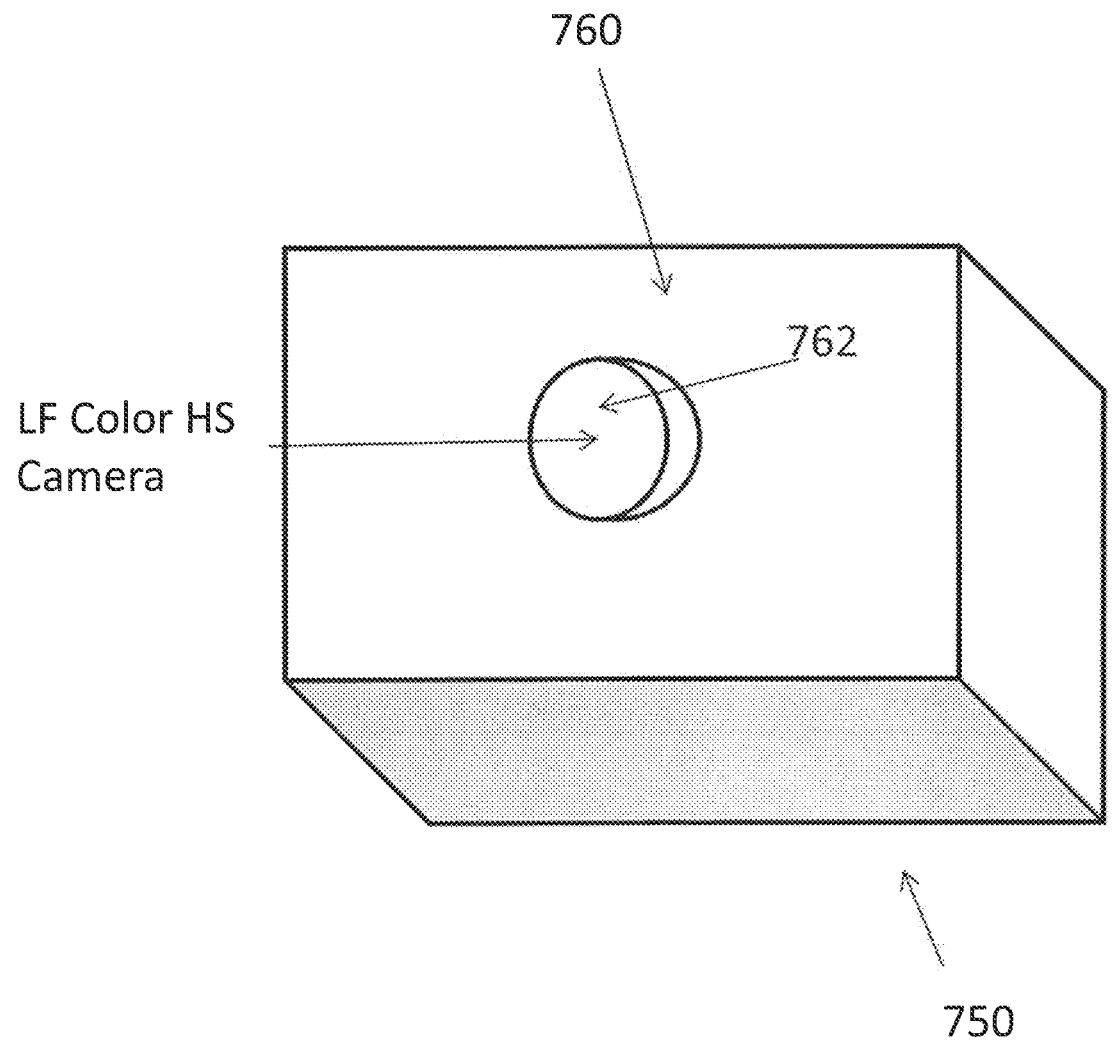

FIG. 21 illustrates a launch monitor 750 configured to measure the kinematics and acceleration of a golf club and golf ball according to an aspect. The launch monitor 750 includes one camera subsystem 760 with a single HS color LF camera 762. The HS color LF camera 762 is configured to capture multiple images at a fixed time interval, which can be used to capture 3D positions of markers on the golf object. From the 3D positions, the kinematics and acceleration of the golf club and golf ball can be determined.

Although the present invention has been described with reference to particular embodiments, it will be understood by those skilled in the art that the invention is capable of a variety of alternative embodiments within the spirit of the appended claims.

Having thus described exemplary embodiments of a launch monitor, it should be noted by those skilled in the art that the within disclosures are exemplary only and that various other alternatives, adaptations, and modifications may be made within the scope of this disclosure. Accordingly, the invention is not limited to the specific embodiments as illustrated herein, but is only limited by the following claims.

What is claimed is:

1. A launch monitor configured to monitor a dynamic golf object, the launch monitor comprising:
   a. a camera system configured to capture a plurality of images of the dynamic golf object for use to generate three dimensional images, wherein the camera system comprises at least one light field camera subsystem comprising at least one light field camera, wherein the light field camera is configured to capture intensity of light and direction of light rays; and
   b. a processor in communication with the camera subsystem, the processor configured to:
      i. generate the three dimensional images from the plurality of images captured by the camera subsystem; and
      ii. generate kinematic information of the dynamic golf object from the three dimensional images.

2. The launch monitor of claim 1, wherein the three dimensional images are generated by determining the actual distance of the dynamic golf object from the launch monitor.

3. The launch monitor of claim 2, wherein the three dimensional images are generated from a sequential portion of the plurality of images to form sequential three dimensional images, wherein the kinematic information is generated by finding a difference in distance of selected points of the dynamic golf object in the sequential three dimensional images.

4. The launch monitor of claim 3, wherein the distance is determined from measuring in the x, y, and z directions.

5. The launch monitor of claim 1, wherein the light field camera comprises a high speed light field camera.

6. The launch monitor of claim 1, wherein the light field camera comprises a color light field camera.

7. The launch monitor of claim 1, wherein the camera system comprises color cameras and the processor is further configured to utilize color filters to eliminate false light from the dynamic golf object in the plurality of images.

8. The launch monitor of claim 7, wherein the color filters comprise HSI filters.

9. The launch monitor of claim 1, wherein the processor is further configured to:
   a. process the plurality of images by:
      i. identifying markings of interest of the dynamic golf object; and
      ii. distinguishing the markings of the interest from the background;
   b. analyze the images to identify pixel locations of the dynamic golf object and the markings of interest into three dimensional locations; and
   c. generate the three dimensional images from the pixel locations.

10. The launch monitor of claim 1, wherein the dynamic golf object comprises a golf ball and a golf club, wherein the launch monitor is further configured to generate the kinematic information of both the golf ball and the golf club at the same time.

11. A launch monitor configured to monitor a dynamic golf object, the launch monitor comprising:

a. a camera system configured to capture a plurality of images of the dynamic golf object for use to generate sequential three dimensional images, wherein the camera system comprises at least one high speed light field camera; and
b. a processor in communication with the camera subsystem, the processor configured to:
  i. generate the sequential three dimensional images from the a portion of sequential images from the plurality of images captured by the camera subsystem by determining the actual distance of the dynamic golf object from the launch monitor; and
  ii. generate kinematic information of the dynamic golf object from the three dimensional images by measuring the distance in three directions.

12. The launch monitor of claim 11, wherein the at least one high speed light field camera further comprises a color high speed light field camera, wherein the processor is configured to apply filters to eliminate false light from the portion of sequential images.

13. The launch monitor of claim 11, wherein the camera system comprises at least one stereographic camera subsystem comprising at least two high speed cameras.

14. The launch monitor of claim 13, wherein the at least two high speed cameras have adjustable shutter speeds.

* * * * *